United States Patent Office 3,701,763
Patented Oct. 31, 1972

3,701,763
PROCESS FOR POLYMERIZATION OF OLEFINS AND CATALYSTS THEREFOR
Shigeru Wada, Otake, Hidesaburo Oi, Wagi, and Norio Matsuzawa and Hiroshi Nishimura, Otake, and Juntaro Sasaki, Iwakuni, Japan, assignors to Mitsui Petrochemical Industries, Ltd., Tokyo, Japan
No Drawing. Filed Oct. 20, 1970, Ser. No. 82,540
Claims priority, application Japan, Oct. 20, 1969, 44/83,232, 44/83,233; Oct. 24, 1969, 44/84,625; Nov. 1, 1969, 44/87,255, 44/87,256, 44/87,257; June 15, 1970, 45/51,054
Int. Cl. C08f 1/56, 3/10
U.S. Cl. 260—88.2 R                                              4 Claims

ABSTRACT OF THE DISCLOSURE

Stereospecific polymers of olefins are produced with little formation of amorphous polymers by contacting olefins with a catalyst composed of (A) a titanium trichloride composition obtained by pulverizing titanium trichloride in the presence of an auxiliary component selected from (1) organic oxygen-containing compounds such as saturated aliphatic monoethers, (2) organic nitrogen-containing compounds such as saturated aliphatic primary amines, (3) organic phosphorus-containing compounds such as trialkyl phosphines, (4) sulfur containing compounds such as carbon disulfide, (5) organic silicon-containing compounds such as triaryl silicon isocyanates, and (6) hydrocarbons such as saturated aliphatic hydrocarbons until α- or γ-crystal type of said titanium trichloride cannot be identified in the X-ray diffraction pattern and extracting the resulting titanium trichloride composition with a solvent such as hydrocarbons, halogenated hydrocarbons or carbon disulfide or mixtures of these with said components (1), (2) and/or (5); and (B) an organoaluminum compound.

This invention relates to an improvement of a catalyst for use in the polymerization of olefins, and more specifically to a process for preparing a catalyst which exhibits sufficiently high polymerizing activity in the polymerization of α-olefins such as propylene and 1-butene to form a stereospecific polymer.

The Ziegler-Natta catalysts have been well known as catalysts for preparing stereospecific polymers of α-olefins such as propylene, 1-butene, 4-methyl-1-pentene or styrene. The most typical of such catalysts is a system composed of a titanium halide and a triethylaluminum or diethylaluminum halide. It is also well known that when α-olefins are polymerized using these catalyst systems, stereospecific polymers can be obtained. The titanium halides now in wide use are titanium trichloride compositions, which are produced by (a) reduction of titanium tetrachloride with metallic aluminum, followed by pulverization in a dry condition to activate it, (b) reduction of titanium tetrachloride with hydrogen or metallic titanium, followed by pulverization, or (c) reduction of titanium tetrachloride with an organoaluminum compound.

However, stereospecific polymerization of α - olefins using a catalyst consisting of a titanium trichloride composition so prepared and an organoaluminum compound results in the formation of great quantities of an amorphous polymer because of insufficient polymerization activity of these catalysts. Usually, therefore, the manufacturing process for stereospecific polymers of α-olefins such as polypropylene involves a step of separating the amorphous polymer.

In the commercial production of typical α-olefin polymers such as polypropylene, poly-1-butene, or poly-4-methyl-1-pentene, the increasing of the amount of polymer formed per unit amount of catalyst and the minimizing of the amount of an amorphous polymer are one of the very important problems. With increasing amounts of polymer formed per unit amount of catalyst, the amount of the catalyst used can be smaller, and the catalyst remaining in the polymer can be removed more easily. Consequently, the amount of the inorganic component contained in the product is reduced, and the quality of the product can be improved in rust occurrence, color, fish eye, weatherability, transparency and insulating property. This also enables the catalyst preparation step, ash removing step, amorphous polymer separating step, etc. in the process of producing polymers to be simplified and to be even omitted in the case of the latter two steps, and results in a curtailment of the plant constructing cost and the cost of production of polymers.

The non-crystalline polymer formed in the polymerization of α-olefins not only makes the operation of the manufacturing plant complicated, but is totally useless. Such polymer is discarded without utilization, and becomes a cause of the high price of the stereospecific polymer product. Under the circumstances, therefore, the development of catalysts having high activity and capable of giving highly stereospecific polymers has been desired.

In general, a titanium trichloride composition obtained by reducing titanium tetrachloride with hydrogen, titanium metal, or aluminum metal has low activity for α-olefins, and gives polymers of insufficient crystallinity. With a view to increasing the activity of such catalyst, there has been proposed a method of pulverizing a titanium trichloride composition with a vibratory mill or dry ball mill (British Pat. No. 850,910 and U.S. Pat. No. 3,032,510).

According to this proposal, the polymerization activity may be increased by the pulverizing treatment, but the crystallinity of the polymer rather tends to be on a decrease. As a result, the stereospecificity of the activated catalyst is worsened, and a great amount of an amorphous polymer is formed.

Another proposal in this line is to reduce titanium tetrachloride with a metal such as aluminum in the presence of an amine, ether or ketone to form a complex compound with aluminum chloride formed, and wash it with an inert solvent, amines or ethers to remove aluminum chloride completely (French Pat. No. 1,315,782). The method proposed is intended to inhibit the formation of an amorphous polymer by removing aluminum chloride in the titanium trichloride composition which is a cause of the formation of the amorphous polymer. Furthermore, owing to severe reaction conditions ascribable to the presence of the amines, ethers or ketones, reaction takes place between the resulting titanium trichloride and these additional compounds, and the polymerization activity of the catalyst and its ability to form a stereospecific polymer tend to be reduced. It is also usual that the performance of the titanium trichloride catalyst produced under such severe conditions is inferior to that of a titanium trichloride composition activated by pulverization. Another disadvantage of this proposal is that the performance of the catalyst is markedly reduced unless the resulting aluminum trichloride complex is completely removed.

On the other hand, U.S. Pat. No. 3,032,510 discloses that titanium tetrachloride is reduced with metallic aluminum in the presence of an aromatic hydrocarbon such as benzene and toluene, the resulting titanium trichloride is recovered and pulverized, and the pulverized titanium trichloride is used as a component of the catalyst. This method may lead to an improved polymerization activity, but meets with difficulty in inhibiting the formation of an amorphous polymer.

It has now been found that stereospecific polymers of olefins can be produced with convenient inhibition of the formation of amorphous polymers and in superior polymerization activity using a catalyst which comprises an organoaluminum compound and a titanium trichloride composition prepared by pulverizing titanium trichloride component in the presence of a certain auxiliary component until the α- or γ-type of the X-ray diffraction pattern of the crystal form of the titanium trichloride cannot be identified, and extracting the resulting titanium trichloride composition with a certain solvent.

The process of the invention has an advantage that a very wide range of compounds can be used as the auxiliary component and also a wide range of solvents can be used, and there is hardly any restriction in the availability and selection of these compounds.

Accordingly, an object of the invention is to provide a process for producing olefins of even more improved crystallinity and a catalyst which exhibits a remarkably increased polymerization activity.

Many other objects and advantages of the invention will become more apparent from the following description.

The process of the invention is differentiated from the first prior proposal given above in that the titanium trichloride component is not one merely pulverized, from the second proposal in that the pulverization must be carried out in the presence of an auxiliary component until the α- or γ-type of the X-ray diffraction pattern of the crystal form of titanium trichloride cannot be identified as the same, and also from the third proposal in that titanium trichloride must be pulverized in the presence of an auxiliary component and the pulverized product must be extracted with a solvent. In the present invention, the combination of the aforementioned conditions is essential, and omission of any of such conditions in following prior proposals would not bring about the superior improved effect of the invention. This will be made clearer from the examples and comparative examples which appear later in the specification.

In the present invention, titanium trichloride component is obtained by reducing titanium tetrachloride with metallic aluminum in a manner well known in the art.

In the preparation of the catalyst of the invention, the titanium trichloride is first pulverized in the presence of an auxiliary component until the α- or γ-type of the X-ray diffraction pattern of the crystal form of the titanium trichloride cannot be identified. The objects of the invention cannot be achieved even when the pulverization is effected in the absence of the auxiliary component. It should also be noted that the objects of the present invention cannot be achieved even if only a step of extracting and washing titanium trichloride with a solvent is carried out with the omission of the pulverizing step.

A very wide range of compounds are used as auxiliary component which is to be present at the time of pulverization treatment of titanium trichloride component in the method of the present invention.

These include:

(1) Organic oxygen-containing compounds selected from the group consisting of aliphatic ethers, aromatic ethers, aliphatic carboxylic acid esters, aromatic carboxylic acid esters, aliphatic alcohols, phenols, aliphatic carboxylic acids, aromatic carboxylic acids, aliphatic carboxylic acid halides, aromatic carboxylic acid halides, aliphatic ketones and aromatic ketones;

(2) Organic nitrogen-containing compounds selected from the group consisting of aliphatic amines, aromatic amines, heterocyclic amines, aromatic nitriles, aromatic isocyanates and aromatic azo compounds;

(3) Organic phosphorus-containing compounds selected from the group consisting of aliphatic phosphines, aromatic phosphines, aliphatic phosphites and aromatic phosphites;

(4) Sulphur-containing compounds selected from the group consisting of carbon disulphide, aliphatic thioethers and aromatic thioethers;

(5) Organic silicon-containing compounds selected from the group consisting of monomer type compounds such as tetrahydrocarbylsilanes, organohydrogenosilanes, organohalogenosilanes, organoaminosilanes, organoalkoxysilanes, organoaryloxysilanes, organosilicon isocyanates and organosilanol carboxylic acid esters; polymer type of compounds such as polysilalkylenes, organopolysilanes, organopolysiloxanes, α,ω-dihaloorganopolysiloxanes, organocyclopolysiloxanes and polysilazanes; and (6) Hydrocarbons selected from the group consisting of aromatic hydrocarbons, aliphatic hydrocarbons, alicyclic hydrocarbons, halogenated aromatic hydrocarbons, halogenated aliphatic hydrocarbons and halogenated alicyclic hydrocarbons.

As the organic oxygen-containing compounds of (1) above, the following examples can be mentioned.

Saturated aliphatic monoethers of 2–32 carbon atoms having an alkyl radical such as dimethyl ether, diethyl ether, di-n-propyl ether, diisopropyl ether, di-n-butyl ether, diisobutyl ether, methyl ethyl ether, methyl n-butyl ether, n-butyl n-pentyl ether, dioctyl ether, isoamyl cetyl ether, dicetyl ether, 2,2'-dibromodiethyl ether and 2,2'-dichlorodiethyl ether;

Aliphatic ethers of 3–20 carbon atoms having at least one unsaturated aliphatic hydrocarbon radical such as 2-methoxybutene, methyl methacryl ether, allyl ethyl ether, allyl butyl ether, 2-ethoxypropene, 6-methoxy-1-hexene, ethyl vinyl ether, methyl vinyl ether, 1-methoxy-2-octene, undecenyl ethyl ether and didecenyl ether;

Aromatic ethers of 7–16 carbon atoms having a saturated alkyl or aryl radical such as anisole, phenetole, isopropyl phenyl ether, tolyl methyl ether, diphenyl ether, ditolyl ether, dimethoxybenzene, 1 - ethoxynaphthalene and 1-phenoxynaphthalene;

Monoethers and diethers of 7–16 carbon atoms which is halogenated and contains at least one aromatic radical such as chloroanisole, bromoanisole, 4,4'-dibromophenyl ether, 2,4-dichloroanisole, 3,5-dibromoanisole, 2,6-diiodoanisole, 2,3,5-trichloroanisole and bromophenetole;

Saturated aliphatic monocarboxylic acid saturated alkyl esters having an aliphatic monocarboxylic acid residual group of 1–21 carbon atoms and a saturated alkyl radical of 1–16 carbon atoms such as methyl formate, ethyl formate, butyl formate, ethyl acetate, n-butyl acetate, sec-butyl acetate, octyl acetate, butyl butyrate, methyl caproate, amyl caprylate, ethyl laurate, methyl palmitate, ethyl stearate and cetyl palmitate;

Saturated aliphatic monocarboxylic acid unsaturated alkyl esters having a saturated aliphatic monocarboxylic acid residual group of 1–8 carbon atoms and an unsaturated alkyl radical of 2–12 carbon atoms such as vinyl acetate, allyl acetate, propenyl acetate, undecenyl acetate and hexenyl propionate;

Unsaturated aliphatic monocarboxylic acid alkyl esters having an unsaturated aliphatic monocarboxylic acid residual group of 2–12 carbon atoms and a saturated or unsaturated alkyl radical of 1–10 carbon atoms such as methyl acrylate, n-amyl acrylate, n-decyl acrylate, ethyl crotonate, methyl isocrotonate, methyl methacrylate, n-butyl methacrylate, methyl undecylenate, methyl 3-methyltetradecenate-(13), phenyl acrylate and vinyl undecylenate;

Aromatic monocarboxylic acid saturated alkyl esters having an aromatic monocarboxylic acid residual group of 7–18 carbon atoms and an alkyl radical of 1–20 carbon atoms such as methyl benzoate, ethyl benzoate, butyl benzoate, n-propyl benzoate, iso-propyl benzoate, sec-butyl benzoate, tert-butyl benzoate, n-amyl benzoate, iso-amyl benzoate, neopentyl benzoate, ethyl o-, m-, p-toluylates, butyl o-, m-, p-toluylates, ethyl o-, m-, p-bromobenzoates, ethyl o-, m-, p-chlorobenzoates, ethyl 1,2-naphthoate and butyl 1,2-naphthoate;

Saturated aliphatic monoalcohols of 1–18 carbon atoms such as methanol, ethanol, n-propanol, isopropanol, n-butanol, isobutanol, sec-butanol, tert-butanol, 1-pentanol, isoamyl alcohol, neopentyl alcohol, 3-pentanol, 3-methyl-butanol-2, hexanol, octanol, lauryl alcohol, cinnamyl alcohol, phenyl ethanol, cetyl alcohol, ethoxy ethanol, 2-chloropropanol, 2-bromopropanol, 3-chloropropanol, ethoxybutanol and 4-chlorobutanol;

Monohydric and dihydric phenols of 6–16 carbon atoms such as phenol, o-, m-, p-cresols, thymol, o-chlorophenol, o-bromophenol, p-chlorophenol, p-bromophenol, tribromophenol, catechol, resorcinol, guaiacol, eugenol, isoeugenol, o-allylphenol, 1,2-naphthols and anthranol;

Saturated aliphatic ketones of 3–20 carbon atoms such as acetone, methyl ethyl ketone, methyl propyl ketone, methyl isobutyl ketone, methyl tert-butyl ketone, ethyl butyl ketone, dibutyl ketone, methyl amyl ketone, ethyl amyl ketone, 2-chlorobutyl ketone, ethyl 2-chlorobutyl ketone and 2-ethoxyethyl methyl ketone;

Saturated aliphatic diketones of 4–12 carbon atoms such as acetylacetone, diacetyl and acetonylacetone;

Aromatic monoketones of 7–18 carbon atoms such as acetophenone, ethyl phenyl ketone, benzophenone, dypnone, cinnamyl methyl ketone, cinnamyl ethyl ketone, n-butyl phenyl ketone, tert-butyl phenyl ketone, propyl phenyl ketone, anthraquinone, anthrone, 2-acetylnaphthalene, naphthoquinone, benzoquinone and fluorenone;

Aromatic monocarboxylic acids of 7–18 carbon atoms such as benzoic acid, o-, m-, p-toluic acids, o-, m-, p-chlorobenzoic acids, o-, m-, p-bromobenzoic acids and 1,2-naphthoic acids;

Saturated aliphatic monocarboxylic acids of 1–20 carbon atoms such as formic acid, acetic acid, propionic acid, valeric acid, octylic acid, undecylenic acid and stearic acid;

Saturated aliphatic carboxylic acid halides of 2–12 carbon atoms such as acetic acid chloride, propionic acid chloride and lauric acid chloride; and Aromatic carboxylic acid halides of 7–15 carbon atoms such as benzoic acid chloride, o-, m-, p-toluic acid chlorides, o-, m-, p-chlorobenzoic acid chlorides and 1,2-naphthoic acid chlorides.

It has been known that in case some of the above organic oxygen-containing compounds are added as promoter to the reaction system at the time of polymerization, the polymerization activity of the catalyst can be improved by 10–30 percent and the crystallinity of the obtained polymer too can be improved. However, the improvement of polymerization activity and the improvement of crystallinity of the obtained polymer attainable by the method of the present invention are far superior to those attainable by the prior art.

As organic nitrogen-containing compounds of (2) above, the following examples can be mentioned.

Saturated aliphatic primary amines of 1–18 carbon atoms such as methylamine, ethylamine, butylamine, isobutylamine, 3 - amino - 2 - methylbutane, octylamine, and octadecylamine;

Saturated aliphatic secondary amines of 2–24 carbon atoms such as dimethylamine, diethylamine, dibutylamine and didodecylamine;

Saturated aliphatic tertiary amines of 3–18 carbon atoms such as trimethylamine, tributylamine and trihexylamine;

Aromatic amines of 6–20 carbon atoms such as aniline, o-, m-, p-toluidines, xylidine, naphthylamine, N-methylaniline, N-ethylaniline, N,N-dimethylaniline, diphenylamine and triphenylamine;

Heterocyclic amines of 5–18 carbon atoms such as pyridine, 2-picoline, 3-picoline, 5-ethyl-2-methyl pyridine, 2-phenyl pyridine, 1,2,3,4-tetramethylpyridine, 2-chloropyridine, 2-bromopyridine, 3-chloropyridine, 3-bromopyridine, 3-iodopyridine, 3,4-dichloropyridine, 2,3,4-trichloropyridine, 2,3,4,6-tetrachloropyridine, pentachloropyridine, 2,3 - dibromopyridine, 2,3,5-tribromopyridine, 2-chloro-6-methyl pyridine, 2-chlorophenyl pyridine, quinoline, isoquinoline, 2-methylquinoline, 3-phenyl quinoline, 6-methyl quinoline, 2,4-dimethyl quinoline, 4,6-dimethyl-2-phenyl quinoline, 3-fluoroquinoline, 4-bromoquinoline, 2,6-dichloroquinoline, 5,6-diiodoquinoline, 6-bromo-2-chloroquinoline, 1-methylisoquinoline, 1,3-dimethylisoquinoline, 4-bromoisoquinoline, acridine and 2-chloroacridine;

Aromatic mononitriles of 7–15 carbon atoms such as benzonitrile, o-, m-, p-tolunitriles, dimethylbenzonitrile, 4-isopropyl benzonitrile, α-naphthonitrile, β-naphthonitrile and 9-cyanoanthracene;

Aromatic monoisocyanates of 7–11 carbon atoms such as phenyl isocyanate, toluyl isocyanate, α-naphthyl isocyanate, β-naphthyl isocyanate and 2,4-dimethyl phenyl isocyanate; and Aromatic azo compounds of 12–20 carbon atoms having no substituent other than hydrocarbon radicals or halogens such as azobenzene, o-, m-, p-azotoluenes, 1,1'-azonaphthalene and 2,2'-azonaphthalene.

As organic phosphorus-containing compound of the above (3), the following examples can be mentioned.

Trialkyl, triaryl, alkyldihalo and haloalkyl phosphines of 3–21 carbon atoms such as trimethylphosphine, triethylphosphine, ethyldichlorophosphine, ethyldimethylphosphine, triisopropylphosphine, triphenylphosphine, tris(trifluoromethyl)phosphine, isobutyldichlorophosphine and chloromethyldichlorophosphine;

Trialkyl phosphites of 3–24 carbon atoms such as trimethyl phosphite, triethyl phosphite, tripropyl phosphite, tributyl phosphite and tris(6-ethylhexyl)phosphite; and Dialkyl aryl phosphites, alkyldiaryl phosphites and triaryl phosphites of 18–24 carbon atoms such as triphenyl phosphite, tricresyl phosphite, tritolyl phosphite, trixylyl phosphite and diphenylethyl phosphite.

As sulphur-containing compounds of (4), the following examples can be mentioned.

Carbon disulphide; and

Aliphatic thioethers of 2–10 carbon atoms and aromatic thioethers of 7–12 carbon atoms such as diethyl thioether, dibutyl thioether, methyl ethyl thioether, propyl butyl thioether, diamyl thioether, isopropyl thioether, thioanisole, thiophenetole, methyl tolyl thioether, benzyl methyl thioether, isopropyl phenyl thioether and diphenyl thioether.

As organic silicon-containing compound of the above (5) (which in the present invention includes the cases where oxygen, nitrogen or sulphur is contained besides silicon), the following examples can be mentioned.

Monomer type compounds (which contain one silicon atom in the molecule) represented by the general formula:

$$R_nSiY_{4-n}$$

wherein R's are alkyl or aryl radicals, Y's are substituents of various kinds, and $n$ is 1 to 4.

$n=4$ Tetrahydrocarbylsilanes having saturated alkyl radicals and/or aryl radicals of 4–50 carbon atoms such as tetramethylsilane, tetraethylsilane, tetrabutylsilane, tetraundecylsilane, tetra-n-octadecylsilane, ethyltrimethylsilane, trimethylpropylsilane, diethyldiphenylsilane, ethyltriphenylsilane, tetraphenylsilane, tetra (o-tolyl) silane, tetrabenzylsilane, tetra(p-diphenyl)silane and 2-naphthyltriphenylsilane.

$n=4$ Tetrahydrocarbylsilanes having an unsaturated alkyl radical of 5–28 carbon atoms such as trimethylvinylsilane, isopropenyltrimethylsilane, vinyltriphenylsilane, benzylvinylsilane and trimethylallylsilane.

$n=1$ to 3, Y=halogens Saturated or unsaturated alkyl or aryl hydrogenosilanes of 1–30 carbon atoms having at least one Si—H bond such as methylsilane, dimethylsilane, trimethylsilane, tri-n-propylsilane, diphenylsilane, triphenylsilane, tritolylsilane and diphenylvinylsilane.

$n=1$ to 3, Y=halogens Saturated or unsaturated alkyl or aryl halogenosilanes of 3–30 carbon atoms having at least one Si-halogen bond such as trichloromethylsilane, dichlorodimethylsilane, tripropylchlorosilane, diallyldichlorosilane, phenyltrichlorosilane, diphenyldichlorosilane, triphenylchlorosilane, tribenzylchlorosilane, triethylfluorosilane, diphenyldifluorosilane, triethylbromosilane, diphenyldibromosilane, triethyliodosilane, chlorodifluoromethylsilane, chloroethyldifluorosilane and dichlorofluoropropylsilane.

$n=1$ to 3, $Y=NH_2$ Trialkyl silyl amines of 3–18 carbon atoms, triaryl silyl amines or their N-alkylamino derivatives such as triethylsilylamine, tripropylsilylamine, triphenylsilylamine, trimethyl (N-methylamino)silane or other trialkyl (N-alkylamino)silanes and trimethyl (N,N-diethylamino)silane.

$n=1$ to 3, $Y=$alkoxy or aryloxy Saturated alkoxy silanes of 4–20 carbon atoms or aryloxy silanes of 6–40 carbon atoms having at least one Si—O—C bond such as methoxymethylsilane, dimethoxydimethylsilane, trimethoxymethylsilane, diethoxydimethylsilane, ethoxytriethylsilane, diethoxydiethylsilane, trimethylphenoxysilane and triethylphenoxysilane.

$n=1$ to 3, $Y=OCOR$ (R:alkyl, aryl) $C_1$–$C_{10}$ aliphatic or $C_7$–$C_{11}$ aromatic monocarboxylic acid esters of $C_3$–$C_{10}$ trialkyl, $C_8$–$C_{20}$ alkylaryl or $C_{18}$–$C_{30}$ triaryl silanols such as trimethylacetoxysilane, triethylacetoxysilane, triphenylacetoxysilane, trimethylbenzoyloxysilane, trimethylpropionylsilane and triethylcaproylsilane.

$n=1$ to 3, $Y=NCO$(isocyanato) Organosilicon monoisocyanates having $C_3$–$C_{10}$ trialkyl, $C_8$–$C_{15}$ dialkylaryl or $C_{18}$–$C_{30}$ triaryl such as trimethyl silicon isocyanate, dimethyl silicon isocyanate, tributyl silicon isocyanate and triphenyl silicon isocyanate.

Polymer type compounds (which contain at least two silicon atoms in the molecule):

Polysilmethylenes represented by the formula $$CH_3SiCH_2[(CH_3)_2SiCH_2]_xSi(CH_3)_3$$

(wherein $x=1$ to 10) such as hexamethyldisilmethylene, hexaethyldisilmethylene, hexa-n-propyldisilmethylene, decamthyltetrasilmethylene and dodecamethylpentasilmethylene are typical, but in general the polysilmethylenes are represented by the general formula

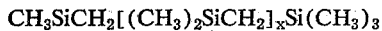
$$R_3SiCH_2[R_2SiCH_2]_nSiR_3$$

(wherein R's are alkyl or aryl radicals).

Linear polyalkyl polysilane of 6–80 carbon atoms or polyaryl polysilanes of 12–80 carbon atoms such as hexamethyldisilane, sym-diethyldi-n-propyldiphenyldisilane, sym-diethyldi-n-propyldibenzyldisilane, hexaphenyldisilane, hexa(p-diphenyl)disilane and octaphenyltrisilane.

As derivatives thereof, alkoxy polysilanes such as 1,1,2,2-tetramethyl-1,2-diethoxydisilane and pentamethylethoxydisilane.

Polyalkyl and/or polyaryl cyclopolysilanes of 12–120 carbon atoms such as dodecamethylcyclohexasilane and octaphenylcyclotetrasilane.

Dialkylpolysilanes, alkylarylpolysilanes and diarylpolysilanes which are linear molecules represented by the general formula:

$$R(R'R''SiO)_xSiR_3$$

wherein R, R', R'' are the same or different, and each represents an alkyl radical of 1–4 carbon atoms, aryl radical of 6–8 carbon atoms or hydrogen, and $x$ stands for an integer of 1–1000, such as hexamethyldisiloxane, decamethyltetrasiloxane, tetracosamethylundecasiloxane, 3-hydroheptamethyltrisiloxane, 3,5-dihydrooctamethyltetrasiloxane, 3,5,7-trihydrononamethylpentasiloxane, tetramethyl-1,3-diphenyldisiloxane, pentamethyl-1,3,5-triphenyltrisiloxane, hexaphenyldisiloxane and octaphenyltrisiloxane.

As compounds obtained by halogenating both ends of the molecule of the above compounds, α,ω-dihaloalkylpolysiloxanes represented by the general formula:

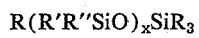
$$X(R_2SiO)_xSiR_2X$$

wherein X is a halogen atom and $x=1$ to 1000, such as 1,3-dichlorotetramethyldisiloxane, 1,5-dichlorohexamethyltrisiloxane and 1,7-dichlorooctamethyltetrasiloxane.

Alkylcyclopolysiloxanes represented by the general formula:

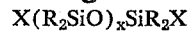
$$(R'''HSiO)_y$$

wherein R''' is an alkyl radical of 1–4 carbon atoms, $y$ stands for an integer of 3 to 8, such as 2,4,6-trimethylcyclotrisiloxane and 2,4,6,8-tetramethylcyclotetrasiloxane.

Alkylcyclopolysiloxanes represented by the general formula:

$$(R''''_2SiO)_z$$

wherein R'''' is an alkyl radical of 1–4 carbon atoms, $z$ stands for an integer of 3 to 9, such as hexamethylcyclotrisiloxane, octamethylcyclotetrasiloxane, decamethylcyclopentasiloxane and dodecamethylcyclohexasiloxane.

Arylcyclopolysiloxanes represented by the general formula:

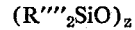
$$(Q_2SiO)_p$$

wherein Q is an aryl radical of 6–8 carbon atoms and $p$ stands for an integer of 3 to 6, such as 1,3,5-triphenyl-1,3,5-trimethylcyclotrisiloxane, hexaphenylcyclotrisiloxane and octaphenylcyclotetrasiloxane.

Alkyl or aryl polysilazanes having an Si—N—Si bond and having 6–50 carbon atoms and a molecular weight not more than 1000 such as hexamethylsilazane, hexamethyltrisilazane, N-methylhexamethylsilazane, octamethylcyclotetrasilazane, hexaphenylcyclotrisilazane, hexaethylcyclotrisilazane, hexaphenylcyclotrisilazane, hexa(n-butyl) cyclotrisilazane and hexaphenylcyclotrisilazane.

As hydrocarbons of the above (6), the following examples can be mentioned.

Saturated aliphatic hydrocarbons of 3–20 carbon atoms such as propane, butane, pentane, hexane, 3-methylpentane, 2,3-dimethylbutane, n-heptane, 2-methylhexane, n-octane, iso-octane, n-decane, n-dodecane, heptadecane, n-eicosane and kerosene;

Alicyclic hydrocarbons of 3–18 carbon atoms such as cyclopropane, cyclobutane, cyclopentane, cyclohexane, cycloheptane, cyclooctane and dicyclohexyl; methylcyclopropane, ethylcyclobutane, methylcyclohexane, tetramethylcyclohexane and ethylcycloheptane; cyclobutene, 1-methylcyclobutene, cyclopentene, 1,5-dimethylcyclohexene, 1-methylcyclooctene and cyclononene; norbornane, norbornene, decaline, 9-methyldecaline, cycloundene, decahydroacenaphthene, perhydrophenanthrene, perhydroanthracene, perhydrotriphenylene; and spiro (2,2)heptane and spiro(2,4)heptane;

Aromatic hydrocarbons of 6–20 carbon atoms which may be substituted by $C_1$–$C_{20}$ alkyl radicals, $C_7$–$C_{15}$ aralkyl radicals or $C_6$–$C_8$ aryl radicals such as benzene, toluene, xylene, ethylbenzene, cumene, ethyltoluene, trimethylbenzene, tetramethylbenzene, hexamethylbenzene, 1,2,4,5-tetraisopropylbenzene, cymene, diphenyl, diphenylmethane, diphenylethane, triphenylmethane, naphthalene, α-methylnaphthalene, 3-methylnaphthalene, 2,6-dimethylnaphthalene and 1-(n-dodecyl)naphthalene;

Acyclic or cyclic olefins of 2–20 carbon atoms having olefinical unsaturation such as ethylene, propylene, butene-1, isobutene, butene-2, hexane-1, octene-1, 3,3-dimethylbutene-1, 4-methyl-1-pentene, nonene-1, octadecene and eicosene; vinylcyclopropane, vinylcyclopropene, vinylcyclohexane, vinylcyclohexene and 1-ethylidene-3-methylcyclohexane; and styrene, stilbene, vinylnaphthalene, triphenylstyrene, α-methylstyrene, allylbenzene and vinylanthracene;

Saturated aliphatic hydrocarbon halides of 1–20 carbon atoms such as methyl iodide, ethyl chloride, ethyl bromide, ethyl iodide, butyl fluoride, n-butyl chloride, n-butyl bromide, n-butyl iodide, hexyl fluoride, octyl bromide, n-nonyl iodide and cetyl chloride; methylene chloride, methylene bromide, methylene iodide, fluorobromomethane, ethylidene chloride, ethylidene bromide, ehylidene iodide and propylidene chloride; ethylene dichloride, ethylene dibromide, ethylene diiodide, propylene chloride, trimethylene bromide and octamethylene chloride; chloroform, iodoform, bromoform, carbon tetrachloride, sym-tetrachloroethane, pentachloroethane, hexachloroethane and hexabromoethane; and difluorodichloromethane and fluoroform;

Unsaturated aliphatic hydrocarbon halides of 2–20 carbon atoms such as vinyl chloride, vinyl bromide, allyl chloride, allyl bromide, allyl iodide, isopropenyl chloride and isopropenyl iodide; 1,2-dichloroethylene, 1,2-dibromoethylene, 1,2-diiodoethylene, 1,1-dichloroethylene, 1,1-difluoroethylene, trichloroethylene and tetrachloroethylene; and 2,5-dibromo-2,5-dimethylhexene-3, 15-bromopentadecene-(2) and 14-bromo-2,6-dimethyltetradecene-(2);

Cycloaliphatic hydrocarbon halides of 3–10 carbon atoms such as chlorocyclopropane, bromocyclopentane, iodocyclopentane, 1-chloromethylcyclopentane, 1-chloro-1-methylcyclopentane, 1,2-dichlorocyclopropane, 1,2-dibromocyclopropane, 1,1,2,2-tetrachlorocyclopropane, 1,2,3,4-tetrafluorocyclobutane, 1,2,3,4-tetrabromocyclobutane and octafluorocyclobutane; hexafluorocyclobutene and octachlorocyclopentene; fluorocyclohexane, hexabromocyclohexane, 1,2,4,5-tetrachlorocyclohexane and undecachlorocyclohexane; and 2-chloro-1-methylcyclohexene, 2,4-dibromo-1,3-cyclohexene, 3-bromocyclooctene, 1,2-dibromocyclooctene, 2-chloro-2-bicyclo(2,2,1)heptene and 1,7-bromo-2-chlorocyclodecene; and Haloderivatives of aromatic hydrocarbons of 6–16 carbon atoms such as chlorobenzene, bromobenzene, iodobenzene, fluorobenzene, o-, m-, p-dichlorobenzenes, o-, m-, p-dibromobenzenes, o-, m-, p-diiodobenzenes, 1,2,4,5-tetrachlorobenzene, hexachlorobenzene, pentabromobenzene, 2-fluoro-1-chlorobenzene and 4-bromo-1-iodo-benzene; o-, m-, p-fluorotoluene, o-, m-, p-bromotoluenes, 2-chloro-m-xylene, 1,2,4,5-tetramethyl - 3-chlorobenzene and amyl-4-bromobenzene; benzyl chloride, benzylidene chloride, 1-chloronapthalene, 1-bromonaphthalene and 1-fluoronaphthalene; 5-chlorotetraline, 2-bromodihydronaphthalene and 1,2,3,4,5,8-hexachlorotetraline; 1-chloro-2-methylnaphthalene, 1 - chloro-2-phenylnaphthalene, 1-chloro(4-chloromethyl)naphthalene, 1,4 - dichloronaphthalene, 2,4-dibromo-1-chloronaphthalene, 1,3,6,7 - tetrabromonaphthalene and octachloronaphthalene; and 2-chloroanthracene, 1 - chloroanthracene, 2,3 - dibromoanthracene and 1,9,10-trichloroanthracene.

The amount of the auxiliary component mentioned above which can be generally selected in the invention is in the range of 0.005 to 0.40 mol (in the case of the silicon compounds, 0.01 to 1.4 mols calculated as the SiO or Si—N bond) per mol of titanium trichloride component in the composition obtained by reduction of titanium tetrachloride with metallic aluminum. Too small amount makes it difficult to achieve the objects of the invention, and too large amount will sometimes make the pulverization difficult.

The preferred range of the components (1) to (6) per mol of titanium trichloride component is 0.01 to 0.3 mol for the organic oxygen-containing compounds and especially 0.01 to 0.1 mol for alcohols, carboxylic acids, carboxylic acid halides and ketones and 0.01 to 0.2 mol for ethers and esters, 0.01 to 0.2 mol for phenols; 0.005 to 0.3 mol for the organic nitrogen-containing compounds, especially 0.01 to 0.1 mol for nitriles, azo compounds and isocyanates, 0.005 to 0.1 mol for primary and secondary amines and 0.01 to 0.2 mol for tertiary and heterocyclic amines; 0.01 to 0.3 mol for the organic phosphorus-containing compounds; 0.01 to 0.40 mol, preferably 0.05 to 0.3 mol, as SiO or Si—N bond, for the organic silicon-containing compounds; 0.01 to 0.3 mol for carbon disulfide and 0.005 to 0.3 mol for thioethers; and 0.01 to 0.3 mol for the hydrocarbons.

Of the organic oxygen-compounds, ethers, carboxylic esters and ketones are most preferred, and alcohols and carboxylic acid halides come next. Among the organic nitrogen-containing compounds, amines, nitriles and azo compounds are most preferred, and isocyanates come next. The organic phosphorus-containing compounds are preferred as much as the above-mentioned compounds which are next preferred. The sulfur-containing compounds are one of the most preferred auxiliary components. Of the organic silicon-containing compounds, silanol carboxylic acid esters, straight chain siloxanes, cyclic polysiloxanes, aminosilanes and silazanes are most preferred, and others come next. Of the hydrocarbons, aromatic hydrocarbons and halogenated aromatic hydrocarbons are most preferred, and others come next.

In the present invention, any methods of pulverizing titanium trichloride obtained by reduction of titanium-tetrachloride with metallic aluminum can be used which are capable of pulverizing the titanium trichloride composition until the α- or γ-type of the X-ray diffraction pattern of the crystal of titanium trichloride cannot be identified. For example, such physical or mechanical pulverizing means as ball mill pulverization, vibratory mill pulverization and impact mill pulverization may be cited.

The pulverization may be carried out at room temperature, but if desired, it may be performed at lower or higher temperatures, for instance, −20° C. to +100° C. The pulverization can be performed in an atmosphere of an inert gas such as nitrogen gas, and if desired, other inert gas such as argon and helium.

Prior to the pulverizing treatment, the titanium trichloride composition may be extracted with a solvent to be described hereinafter, followed by pulverizing treatment in the presence of the auxiliary components.

The pulverized titanium trichloride composition is then subjected to an extracting and washing step. The solvent used in this step is selected from the group consisting of (i) compounds selected from aromatic hydrocarbons, aliphatic hydrocarbons, alicyclic hydrocarbons, halogenated aromatic hydrocarbons, trichloroethylene, halogenated alicyclic hydrocarbons and carbon disulfide and (ii) mixtures of the compounds (i) and the auxiliary component selected from the compounds (1), (2) and (5) above.

Specific examples of compounds (i) above are the same as those described with respect to the auxiliary component (6). Trichloroethylene is the only halogenated aliphatic hydrocarbon that can be used for this purpose. Such analogous compounds as tetrachloroethylene, tetrachloroethane, chloroform, n-butylbromide, ethyl bromide and carbon tetrachloride have no catalyst improving effect, and rather deteriorate the performance of the catalyst.

There is not any particular restriction on the extraction of the pulverized titanium trichloride composition in the presence of the auxiliary component. It may be contacted with the solvent at room temperature, or at elevated temperatures with stirring, or under ice cooling. Generally, the contacting is performed at 20–100° C. for several minutes to several days.

The titanium trichloride composition so treated is separated from the solvent, and used as a component of catalyst. Prior to use, it may be washed or extracted with a pure solvent cited under (i) above. Such treatment may be effected by a batchwise washing method or extraction with a Soxhlet extractor or by a continuous countercurrent washing. By any of these methods, the solvent used should be separated from the treated titanium trichloride composition as far as possible.

When the mixed solvent described under (ii) above, the amount of the solvent under (i) may be optional, but generally is 1 to 100 parts by weight per part of the pulverized titanium trichloride composition. The auxiliary component (ii) may be used in an amount of 0.005 to 10.0 parts by weight per part of the titanium trichloride composition.

In the case of using the mixed solvent containing the organic oxygen-containing compound (1) mentioned above, the amount of the oxygen-containing compounds is 0.005 to 10.0 parts by weight per part of the titanium trichloride composition, preferably 0.01 to 10.0 parts for ethers, 0.01 to 5.0 parts for ketones and esters, 0.005 to 0.3 part for alcohols, 0.005 to 0.2 part for phenols, and 0.005 to 0.5 part for carboxylic acid halides and carboxylic acids.

In the case of the mixed solvent containing the organic nitrogen-containing compound (2), the amount of the organic nitrogen-containing compound is usually 0.005 to 0.5 part by weight per part of the titanium trichloride composition, preferably 0.01 to 0.5 part by mole for heterocyclic amines and aromatic tertiary amines, 0.01 to 0.3 mol part for tertiary amines, isocyanates, azo compounds and nitriles, and 0.005 to 0.2 mol part for secondary amines.

In the case of the mixed solvent containing the organic silicon-containing compound, there is no particular limitation on the ratio of the amount of the compound to that of the titanium trichloride composition. However, the preferred range of the amount per part by weight of the titanium trichloride composition is 0.05 to 10 parts by weight for organohalogenosilanes, 0.05 to 5.0 parts by weight for organoalkoxy silanes, aryloxy silanes and organopolysiloxanes, 0.02 to 2.0 parts by weight for organosilanol carboxylic acid esters and organosilazanes, and 0.02 to 1.0 part by weight for the organoisocyanate silanes (alternatively called organosilicon isocyanate). The preferred amount of organosilanols is 0.02 to 1.0 part by weight, and that of organosilthianes is 0.02 to 2.0 parts by weight.

When preparing a mixed solvent comprising various compounds selected from (1), (2) and (5) mentioned above, these compounds should be mixed at the ratios described above. The mixed solvent and the auxiliary compounds may be mixed at any desired ratios, but generally, the amount of the inert solvent is larger.

The catalyst used in the present invention consists of an organoaluminum compound and the titanium trichloride composition obtained by the aforementioned procedure. Any organoaluminum compounds can be used which are known as one component of the Ziegler-Natta type catalyst.

Examples of such organoaluminum compounds include, for instance, trialkylaluminum, dialkylaluminum halides, dialkylaluminum alkoxides, alkylaluminum alkoxy halides, alkylaluminum dihalides, reaction products of these with electron-donor compounds, or reaction products of these with alkali metal halides or alkali metal complex fluorides of transition metals. Examples of the electron-donor compounds are described, for example, in U.S. Pat. Nos. 3,081,287, 3,116,274 and 3,230,208.

The olefin monomers to be polymerized with the catalyst of the invention are, for instance, propylene, 1-butene, 4 - methyl - 1 - pentene, styrene, 1-pentene, 3-methyl-1-butene, and trimethyl vinyl silane. The catalyst can also be applied to the copolymerization of ethylene with propylene, ethylene with 1-butene, ethylene with 1-hexene, or propylene with styrene, and also to the homopolymerization of ethylene.

The polymerization of olefins using the catalyst of the invention may be performed by any known means under known conditions. For instance, the polymerization can be performed at a temperature of 20 to 100° C. and a pressure of normal atmospheric pressure to 100 kg./cm.$^2$. The polymerization may be conducted in an inert solvent or in the absence of a solvent where the liquefied monomer acts as a solvent in some cases either batchwise or continuously.

In the polymerization of olefins according to the process of the invention, hydrogen may be used as a molecular weight regulating agent for olefin polymers. After completion of the polymerization, the catalyst is generally deactivated with lower alcohols such as methanol, ethanol, butanol, and isopropanol in the same way as the Ziegler-Natta type polymerization of olefins. But where the yield of polymer per unit amount of the catalyst is large, the aforementioned deactivating treatment may be omitted, and the catalyst may merely be contacted with air or water vapor.

The invention will further be described by the following examples and comparative examples which are not intended to limit the invention in any way.

Examples 1 to 2, Control and Comparative Examples 1 to 8

Titanium tetrachloride (1,400 grams) was reacted with 27.0 g. of metallic aluminum powders in the presence of 18.0 g. of aluminum chloride in a stainless steel autoclave at 200° C. for 20 hours. Unreacted titanium tetrachloride and free aluminum chloride were removed by distillation at atmospheric pressure from the titanium trichloride composition obtained. The remaining solid was heated for 5 hours at 200° C. at a reduced pressure of 0.2 mm. Hg to remove the remaining titanium tetrachloride. Some 570 g. of a light reddish purple titanium trichloride composition were obtained.

Thirty grams of this titanium trichloride composition and the auxiliary component (organic oxygen-containing compound) indicated in Table I–a were put into a cylindrical stainless steel vessel having an inner capacity of 800 ml., and milled at 140 r.p.m. for about 24 hours in an atmosphere of nitrogen in the presence of 100 stainless steel balls each having a diameter of 16 mm. until the α-, γ-type of the X-ray diffraction pattern of titanium trichloride component could not to be identified. The pulverized composition was extracted and washed for 24 hours with the solvent indicated in Table I–a using a Soxhlet extractor equipped with a glass filter to form a titanium trichloride composition to be used as a component of the catalyst.

A 500 ml. glass separable flask equipped with a stirrer, a thermometer, a propylene blow inlet and an exhaust pipe was charged with 250 ml. of refined kerosene, and purged with nitrogen for one hour with stirring. The titanium trichloride component (2.0 g.) obtained above and 10 millimols of diethylaluminum chloride were added in this order in an atmosphere of nitrogen, and the temperature was raised to 70° C. Thereafter, propylene was introduced and polymerized for 2 hours at atmospheric pressure. After completion of the polymerization, the propylene was replaced by nitrogen gas, and the temperature was decreased. Methanol (100 ml.) was added to deactivate the catalyst. The polymer slurry was filtered, and the powdery solid obtained on a filter plate was washed several times with methanol, and dried for 2 days at 70° C. and a reduced pressure of 50 mm. Hg to get a solid propylene polymer. The results obtained are shown in Table I–a. This table also shows the results obtained in a control in which propylene was polymerized in the same manner as in Example 1 except using the titanium trichloride composition not pulverized; Comparative Example 1 in which propylene was polymerized in the same way as set forth in Example 1 except that the pulverized titanium trichloride composition was used in the absence of the auxiliary component; Comparative Example 2 in which propylene was polymerized in the same way as set forth in Example 1 except that the extracting and washing treatment of the titanium trichloride composition was omitted; Comparative Example 3 in which the procedure of Example 1 was repeated except that the titanium trichloride composition used in Comparative Example 1 was extracted and washed in the same way as in Example 1, and the resulting titanium trichloride composition was used; Comparative Example 4 in which the procedure of Example 1 was repeated except that a titanium trichloride composition was first extracted and washed with a solvent and then pulverized in the absence of the auxiliary component; Comparative Example 5 in which the procedure of Example 1 was repeated except that a titanium trichloride composition obtained by extracting and washing the titanium trichloride composition used in Comparative Example 4 further with a solvent was used; Comparative Example 6 in which the procedure of Example 1 was repeated except that there was used a titanium trichloride composition obtained by reducing titanium tetrachloride with metallic aluminum in the presence of an auxiliary component (organic oxygen-containing component) and without pulverizing, extracted and washed with a solvent in the same manner as set forth in Example 1; Comparative Example 7 in which the procedure of Example 1 was repeated except that a titanium trichloride obtained by reducing titanium tetrachloride with metallic aluminum in the presence of an auxiliary component (organic oxygen-containing compound) and pulverizing the resulting titanium trichloride composition with the omission of the extracting and washing step was used; and Comparative Example 8 in which the procedure of Example 1 was repeated except that a titanium trichloride composition used was obtained by reducing titanium tetrachloride with hydrogen.

In all of the tables appearing in this specification, T.I. stands for total isotacticity which expresses the percentage of the weight of polymer difficultly soluble in a specific extracting solvent (usually heptane) based on the weight of total polymer formed (a portion of the polymer readily soluble in a polymerization solvent is weighed after evaporation of the solvent, and included in the weight of the total polymer). On the other hand, partial isotacticity indicates the percentage of the weight of a polymer difficulty soluble in a specific extracting solvent based on the weight of polymer excluding the weight of a portion readily soluble in a polymerization solvent. Usually, therefore, the total isotacticity is smaller than the partial isotacticity, A.D. is an abbreviation of apparent density; the weight of the polymer is expressed in grams and its apparent volume, in cubic centimeters.

TABLE I-a

| | | TiCl₃ component | | | | | Polypropylene | | |
|---|---|---|---|---|---|---|---|---|---|
| | | Milling treatment step | | | Extraction treatment step | | | | |
| | Reduction | Yes or no | Auxiliary component | Mol | Yes or no | Solvent | Organo-aluminum compound | Total yield (g.) | T.I. (percent) | A.D. (g./cc.) |
| Example: | | | | | | | | | | |
| 1 | Al | Yes | Butyl acetate | 0.1 | Yes | Toluene | (C₂H₅)₂AlCl | 120.3 | 94.9 | 0.371 |
| 2² | Al | Yes | do | 0.1 | Yes | do | (C₂H₅)₂AlCl | 118.9 | 94.3 | 0.369 |
| Control | Al | No | | | No | | (C₂H₅)₂AlCl | 6.0 | | |
| Comparison: | | | | | | | | | | |
| 1 | Al | Yes | | | No | | (C₂H₅)₂AlCl | 71.0 | 88.8 | 0.304 |
| 2 | Al | Yes | Butyl acetate | 0.1 | No | | (C₂H₅)₂AlCl | 59.2 | 90.6 | 0.333 |
| 3 | Al | No | | | Yes | Toluene | (C₂H₅)₂AlCl | 13.2 | 96.2 | |
| 4¹ | Al | Yes | | | Yes | do | (C₂H₅)₂AlCl | 71.0 | 88.3 | 0.311 |
| 5¹ | Al | Yes | | | Yes | do | (C₂H₅)₂AlCl | 81.5 | 91.0 | 0.302 |
| 6 | Al plus butyl acetate | No | | | Yes | do | (C₂H₅)₂AlCl | 5.3 | 93.5 | |
| 7 | do | Yes | Butyl acetate | 0.1 | No | | (C₂H₅)₂AlCl | 32.1 | 89.2 | |
| 8 | Hydrogen | Yes | do | 0.1 | Yes | Toluene | (C₂H₅)₂AlCl | 45.0 | 88.0 | 0.245 |

¹ Added amount of auxiliary components to 1 mol. of TiCl₃ component.
² TiCl₃ component was extracted with toluene before milling.

Examples 3 to 28 and Comparative Examples 9 to 32

The procedure of Example 1 was repeated except that the amounts and classes of auxiliary components consisting of oxygen-containing organic compounds and extraction solvents were varied. The results are shown in Table I-b.

TABLE I-b

| | TiCl₃ component | | | Polypropylene | | |
|---|---|---|---|---|---|---|
| | Auxiliary component | | Extraction solvent | Total yield (g.) | T.I. (percent) | A.D. (g./cc.) |
| | Class | Amount, g. | | | | |
| Example 3 | Diphenyl ether | 3.8 | Toluene | 103.0 | 95.1 | 0.377 |
| Comparison 9 | do | 3.8 | | 69.3 | 90.6 | 0.341 |
| Example 4 | Anisole | 2.2 | Toluene | 120.9 | 94.9 | 0.380 |
| Example 5 | do | 2.2 | Heptane | 101.1 | 92.8 | 0.360 |
| Example 6 | do | 2.2 | Chlorobenzene | 128.3 | 95.5 | 0.370 |
| Comparison 10 | do | 2.2 | | 73.9 | 90.4 | 0.350 |
| Example 7 | n-Butyl ether | 2.1 | Toluene | 100.0 | 95.6 | 0.405 |
| Comparison 11 | do | 2.1 | | 90.0 | 92.6 | 0.387 |
| Example 8 | Allyl butyl ether | 1.7 | Toluene | 93.0 | 93.6 | 0.377 |
| Comparison 12 | do | 1.7 | | 50.6 | 92.0 | 0.348 |
| Example 9 | Orthodimethoxy-benzene | 2.7 | Chlorobenzene | 120.3 | 93.2 | 0.361 |
| Comparison 13 | do | 2.7 | | 65.3 | 90.3 | 0.340 |
| Example 10 | Orthobromoanisole | 4.0 | Toluene | 130.3 | 94.2 | 0.378 |
| Comparison 14 | do | 4.0 | | 72.0 | 91.4 | 0.355 |
| Example 11 | Ethyl formate | 1.1 | Toluene | 108.0 | 95.2 | 0.352 |
| Comparison 15 | do | 1.1 | | 56.8 | 89.7 | 0.314 |
| Example 12 | Ethyl acetate | 1.4 | Toluene | 121.5 | 94.3 | 0.355 |
| Comparison 16 | do | 1.4 | do | 72.5 | 90.2 | 0.320 |
| Example 13 | Butyl butyrate | 2.3 | do | 100.0 | 94.0 | 0.355 |
| Comparison 17 | do | 2.3 | | 60.0 | 90.0 | 0.311 |
| Example 14 | Ethyl laurate | 3.5 | Toluene | 95.0 | 93.4 | 0.350 |
| Comparison 18 | do | 3.5 | | 72.0 | 90.5 | 0.321 |
| Example 15 | Methyl methacrylate | 1.5 | Toluene | 92.0 | 94.0 | 0.340 |
| Comparison 19 | do | 1.5 | | 54.0 | 89.5 | 0.340 |
| Example 16 | Methyl benzoate | 2.0 | Toluene | 92.0 | 94.0 | 0.340 |
| Comparison 20 | do | 2.0 | | 54.0 | 89.5 | 0.340 |
| Example 17 | Ethyl monochloroacetate | 1.8 | Chlorobenzene | 92.5 | 95.9 | 0.355 |
| Comparison 21 | do | 1.8 | | 62.0 | 90.5 | 0.321 |
| Example 18 | Ethyl trifluoroacetate | 2.1 | Toluene | 105.2 | 95.0 | 0.340 |
| Comparison 22 | do | 2.1 | | 60.3 | 91.0 | 0.302 |
| Example 19 | Acetone | 1.0 | Toluene | 93.2 | 91.3 | 0.296 |
| Comparison 23 | do | 1.0 | | 33.2 | 87.3 | 0.216 |
| Example 20 | Acetophenone | 1.8 | Toluene | 92.5 | 93.9 | 0.340 |
| Comparison 24 | do | 1.8 | | 28.2 | 88.0 | 0.220 |
| Example 21 | Acetyl acetone | 1.1 | Toluene | 95.0 | 92.7 | 0.360 |
| Comparison 25 | do | 1.1 | | 40.8 | 82.6 | 0.301 |

TABLE I-b—Continued

| | TiCl₃ component | | | Polypropylene | | |
|---|---|---|---|---|---|---|
| | Auxiliary component | | Extraction solvent | Total yield (g.) | T.I. (percent) | A.D. (g./cc.) |
| | Class | Amount, g. | | | | |
| Example 22 | Anthraquinone | 2.4 | Toluene | 94.7 | 93.6 | 0.344 |
| Comparison 26 | do | 2.4 | | 23.8 | 87.0 | 0.220 |
| Example 23 | Ethanol | 0.4 | Toluene | 115.1 | 93.2 | 0.342 |
| Comparison 27 | do | 0.4 | | 81.1 | 88.7 | 0.293 |
| Example 24 | Phenol | 0.7 | Toluene | 102.8 | 91.2 | 0.299 |
| Comparison 28 | do | 0.7 | | 72.0 | 87.3 | 0.251 |
| Example 25 | Benzoyl chloride | 1.1 | Toluene | 95.0 | 94.8 | 0.381 |
| Comparison 29 | do | 1.1 | | 24.8 | 86.6 | 0.295 |
| Example 26 | Benzoic acid | 0.9 | Toluene | 108.3 | 90.9 | 0.303 |
| Comparison 30 | do | 0.9 | | 53.9 | 86.3 | 0.253 |
| Example 27 | Acetic acid | 0.4 | Toluene | 96.0 | 90.8 | 0.279 |
| Comparison 31 | do | 0.4 | | 52.0 | 87.3 | 0.261 |
| Example 28 | Lauric acid | 1.6 | Toluene | 103.2 | 93.3 | 0.330 |
| Comparison 32 | do | 1.6 | | 76.3 | 87.5 | 0.324 |

Example 29 and Comparative Example 33

An 800 ml. steel cylindrical ball mill was charged with 30 g. of the unpulverized titanium trichloride composition produced in Example 1 and 2.4 g. of phenetole in an atmosphere of nitrogen together with 100 steel balls each having a diameter of 16 mm., and the pulverization was performed for 24 hours at room temperature. The resulting mixture of the titanium trichloride composition and phenetole was put into a Soxhlet extractor equipped with a glass filter in an atmosphere of nitrogen, and extracted and washed with toluene for 24 hours. After completion of the extracting and washing treatment, excess toluene was removed by distillation under reduced pressure at 70° C. to yield a dry titanium trichloride composition.

A 5-liter four-necked flask equipped with a stirrer, an inlet for insertion of a thermometer, a nitrogen blow inlet, and an exhaust outlet was charged with 3.8 liters of refined kerosene and 120 g. of potassium titanium fluoride, and with stirring, the inside of the flask was sufficiently purged with nitrogen. Ethylaluminum dichloride (245 g.) was then added, and these components were reacted for 6 hours at 60° C. The product was cooled to room temperature, and allowed to stand still. The supernatant liquid was recovered. The concentration of organoaluminum compound based on aluminum in the supernatant liquid was 0.237 mol/liter.

A 500 ml. separable flask equipped with a stirrer, a propylene blow inlet, a thermometer and an exhaust pipe was charged with 210 ml. of refined kerosene. With stirring, the inside of the flask was fully purged with nitrogen, and then 42 ml. of a solution of the resulting organoaluminum compound in kerosene and 0.28 ml. of allylbutyl ether were charged into the flask. Subsequently, 1.98 g. of the titanium trichloride composition prepared above was added, and the temperature was raised to 70° C. Propylene gas was introduced at atmospheric pressure in an amount slightly in excess of the amount to be absorbed, and polymerized for 2 hours. Thereafter, the propylene gas was replaced by nitrogen gas. The product was cooled, and with addition of 100 ml. of methanol, the catalyst was deactivated. The product was withdrawn from the flask, and a solid polymer was recovered by filtration on the glass filter. The solid polymer was washed several times with methanol, and dried at 70° C. for 48 hours in a vacuum drier. The yield of the solid polymer (polypropylene) was 134.1 g., and it had a bulk apparent density of 0.375 and a crystallinity of 96.5%. The amount of the polymer dissolved in the filtrate was 2.4 g. Hence, the total yield was 136.5 g., and the crystallinity of the total polymer (T.I.) was 95.2%.

When the foregoing procedure was repeated except that the titanium trichloride composition was not extracted and washed after pulverization, polypropylene was obtained in a total amount (sum of the solid polymer and the polymer dissolved in kerosene) of 80.0 g., which had a bulk density of 0.302 and a crystallinity of 91.8%.

Example 30 and Comparative Example 34

The polymerization of propylene was performed in the same manner as set forth in Example 29 except that 2 g. of the titanium trichloride composition of Example 3 and 10 millimols of ethylaluminum ethoxychloride instead of the reaction product of ethylaluminum dichloride with potassium titanium fluoride were used in the absence of allylbutyl ether and the polymerization was performed for one hour. The yield of total polypropylene was 66.6 g., and it had a crystallinity of 86.0% and a bulk density of 0.299.

When the foregoing procedure was repeated except that a titanium trichloride composition not extracted with toluene was used, the amount of total polypropylene yielded was 50.2 g., and it had a crystallinity of 83.4% and a bulk density of 0.275 (Comparative Example 34).

Example 31 and Comparative Example 35

The inside of a 2-liter autoclave was sufficiently purged with a nitrogen gas. A glass ampoule containing 0.015 g. of the same titanium trichloride component as used in Example 1 was mounted in a thermometer fitting pipe in the autoclave so that upon rotation of a stirrer, the stirring vanes would collide with the ampoule and break it. The inside of the autoclave was further purged with propylene gas, and 460 g. of propylene and 7.5 millimols of diethylaluminum chloride were introduced into the autoclave at room temperature, followed by introduction of 2200 ml. of hydrogen. The system was heated to 80° C., and then the stirrer was operated. On breakage of the ampoule, the polymerization of propylene was started. After polymerizing for 8 hours, unreacted propylene was flushed, and the catalyst was deactivated with the addition of methanol. Polypropylene was obtained in an amount of 167 g. It had a bulk density of 0.320, a crystallinity of 88% and an [η] of 3.63.

When the foregoing procedure is repeated except that a titanium trichloride composition not extracted and washed with toluene was used, polypropylene was obtained in an amount of 104 g. It had a bulk density of 0.300 and a crystallinity of 83% (Comparative Example 35).

Example 32 and Comparative Example 36

Using the apparatus used in Example 3, 1.5 g. of the same titanium trichloride composition as used in Example 3 and 10 millimols of diethylaluminum chloride was added. With stirring, the mixture was heated to 40° C., and 50 ml. of 4-methyl-1-pentene were added dropwise over a period of 10 minutes. The polymerization was performed for one hour, and the product was post-treated in the same way as set forth in Example 2. The yield of the polymer produced was 19 g., and it had a crystallinity of 92%.

When the foregoing procedure was repeated except that a titanium trichloride composition not extracted and washed with toluene was used, the polymer was obtained in an amount of 13 g., and it had a crystallinity of 87.8% (Comparative Example 36).

Example 33 and Comparative Example 37

Using the same catalyst and apparatus as used in Example 1, a gaseous mixture of 98.8 parts by volume of propylene and 1.2 parts by volume of ethylene was introduced at 70° C. for one hour. A polymer having a crystallinity of 85.8% and an ethylene content of 2.4% was formed in an amount of 57 g.

When the foregoing procedure was repeated except that a titanium trichloride composition not extracted and washed with toluene was used, a polymer having a crystallinity of 83% was obtained in an amount of 35 g. (Comparative Example 37).

Examples 34 to 35 and Comparative Examples 38 to 46

The polymerization of propylene was performed in the same way as set forth in Example 1 using either the titanium trichloride composition (to be abbreviated as $TiCl_3(A)$) obtained in the same way as in Example 1 but omitting the pulverizing treatment or activated titanium trichloride composition (to be abbreviated as $TiCl_3(AA)$) which was obtained by putting 120 g. of washed titanium trichloride composition into an 800 ml. stainless steel cylindrical vessel and activating it by a vibratory mill in the presence of 850 stainless steel balls each having a diameter of 10 mm., followed by particle size adjustment in an atmosphere of nitrogen and removal of the titanium trichloride composition having fine particles, both in conjunction with toluene and anisole as the auxiliary components. The results obtained are given in Table II–a.

This table also shows the results obtained in Comparative Example 38 in which propylene was polymerized in the same manner as in Example 34 except using the titanium trichloride composition not pulverized; Comparative Example 39 in which propylene was polymerized in the same way as set forth in Example 34 except that the pulverized titanium trichloride composition was used in the absence of the auxiliary component; Comparative Example 40 in which propylene was polymerized in the same way as set forth in Example 34 except that the extracting and washing treatment of the titanium trichloride composition was omitted; Comparative Example 41 in which the procedure of Example 34 was repeated except that the titanium trichloride composition used in Comparative Example 39 was extracted and washed in the same way as in Example 34, and the resulting titanium trichloride composition was used; Comparative Example 42 in which the procedure of Example 34, was repeated except that a titanium trichloride composition was first extracted and washed with a solvent and then pulverized in the absence of the auxiliary component; Comparative Example 43 in which the procedure of Example 34 was repeated except that there was used a titanium trichloride composition obtained in Comparative Example 39 further washed first with toluene and then with anisole; Comparative Example 44 in which the procedure of Example 34 was repeated except that there was used a titanium trichloride composition obtained by reducing titanium tetrachloride with metallic aluminum in the presence of an auxiliary component (organic oxygen-containing component) and without pulverizing, extracted and washed with a solvent in the same manner as set forth in Example 34; Comparative Example 45 in which the procedure of Example 34 was repeated except that there was used a titanium trichloride obtained by reducing titanium tetrachloride with metallic aluminum in the presence of an auxiliary component (organic oxygen-containing compound) and pulverizing the resulting titanium trichloride with the omission of the extracting and washing step; and Comparative Example 46 in which the procedure of Example 34 was repeated except that a titanium trichloride composition used was obtained by reducing titanium tetrachloride with hydrogen.

TABLE II-a

| | TiCl₃ component | | | | | | Polypropylene | | |
|---|---|---|---|---|---|---|---|---|---|
| | | Milling treatment step | | Extraction treatment step | | | | | |
| | Reduction: | Yes or no | Auxiliary component | | Yes or no | Solvent | Organo-aluminum compound | Total yield (g.) | T.I. (percent) | A.D. (g./cc.) |
| | | | Class | Amt.[2] | | | | | | |
| Example | | | | | | | | | | |
| 34 | Al | Yes | | | Yes | Toluene plus anisole | (C₂H₅)₂AlCl | 153.2 | 96.0 | |
| 35 [1] | Al | No | | | Yes | do | (C₂H₅)₂AlCl | 171.2 | 95.7 | |
| Comparison: | | | | | | | | | | |
| 38 | Al | No | | | No | | (C₂H₅)₂AlCl | 6.5 | 93.3 | |
| 39 | Al | Yes | Toluene 5 mol / Anisole 0.5 mol | | No | | (C₂H₅)₂AlCl | 71.0 | 88.8 | |
| 40 | Al | Yes | Toluene 5 mol / Anisole 0.5 mol | | No | | (C₂H₅)₂AlCl | 61.3 | 87.5 | |
| 41 | Al | No | | | Yes | Toluene plus anisole | (C₂H₅)₂AlCl | 6.7 | 92.9 | |
| 42 | Al | Yes | | | Yes [4] | do | (C₂H₅)₂AlCl | 62.3 | 86.9 | |
| 43 | Al | Yes | | | Yes [5] | 1st toluene, 2nd anisole | (C₂H₅)₂AlCl | 53.2 | 93.1 | |
| 44 | Al plus toluene, anisole.[3] | No | | | Yes | Toluene plus anisole | (C₂H₅)₂AlCl | 10.3 | 94.0 | |
| 45 | do | Yes | Toluene 1.5 ml / Anisole 0.015 mol | | No | | (C₂H₅)₂AlCl | 61.3 | 87.9 | |
| 46 | Hydrogen | Yes | Toluene 1.5 ml / Anisole 0.015 mol | | Yes | Toluene plus anisole | (C₂H₅)₂AlCl | 66.2 | 86.3 | |

[1] TiCl₃ (AA) manufactured by Stauffer Chemical Co. was used.
[2] Molar parts to TiCl₃ component.
[3] TiCl₃ was prepared in the presence of 6 ml. of toluene by reacting 1 mol of TiCl₄, 10.8 ml. of anisole and 0.1 mole of Al powder for 12 hrs., then filtering, washing with toluene three times and dried.
[4] Extracted before milling.
[5] Extracted with two solvents one by one.

Examples 36 to 43 and Comparative Examples 47 to 54

The procedure of Example 34 was repeated under varying conditions as noted below. The results are shown in Table II–b.

TABLE II-b

| | TiCl₃ component | | Polypropylene | | | |
|---|---|---|---|---|---|---|
| | Auxiliary component | | Extraction solvent (ml.) | Total yield (g.) | T.I. (per-cent) | A.D (g./cc.) |
| | Class | Amt. | | | | |
| Ex. 36 | Anisole | 1.8 ml. | Toluene 150 / Anisole 8.2 | 172.3 | 94.5 | 0.354 |
| Comp. 47 | do | 1.8 ml. | | 53.8 | 90.3 | 0.344 |
| Ex. 37 | Silicon oil | 3.0 ml. | Toluene 150 / Anisole 8.2 | 158.2 | 95.1 | 0.366 |
| Comp. 48 | do | 3.0 ml. | | 83.3 | 91.1 | 0.342 |
| Ex. 38 | Butyl acetate | 1.5 g. | Toluene 150 / Anisole 8.2 | 146.3 | 94.8 | 0.386 |
| Comp. 49 | do | 1.5 g. | | 61.0 | 90.0 | 0.269 |
| Ex. 39 | Benzo-nitrile | 0.6 g. | Toluene 150 / Anisole 8.2 | 118.9 | 95.2 | 0.364 |
| Comp. 50 | do | 0.6 g. | | 45 | 88.9 | |
| Ex. 40 | Pyridine | 0.5 g. | Toluene 150 / Anisole 8.2 | 153.3 | 94.9 | 0.366 |
| Comp. 51 | do | 0.5 g. | | 64.1 | 88.5 | |
| Ex. 41 | Trichloro-ethylene | 1.5 g. | Toluene 150 / Anisole 8.2 | 121.0 | 95.4 | 0.351 |
| Comp. 52 | do | 1.5 g. | | 63.9 | 92.5 | |
| Ex. 42 | Triphenyl phosphite | 3.3 g. | Toluene 150 / Anisole 8.2 | 129.5 | 94.4 | 0.354 |
| Comp. 53 | do | 3.3 g. | | 40.8 | 91.6 | |
| Ex. 43 | Toluene | 20 ml. | Toluene 150 / Anisole 8.2 | 162.3 | 95.8 | 0.377 |
| Comp. 54 | do | 20 ml. | | 67.3 | 94.2 | |

Example 44 and Comparative Examples 55 to 63

The procedure of Example 1 was repeated except that cyclohexane was used as the auxiliary component. The results are shown in Table III-a.

This table also shows the results obtained in Comparative Example 55 in which propylene was polymerized in the same manner as in Example 44 except using the titanium trichloride composition not pulverized; Comparative Example 56 in which propylene was polymerized in the same way as set forth in Example 44 except that the pulverized titanium trichloride composition was used in the absence of the auxiliary component; Comparative Example 57 in which propylene was polymerized in the same way as set forth in Example 44 except that the extracting and washing treatment of the titanium trichloride composition was omitted; Comparative Example 58 in which the procedure of Example 44 was repeated except that the titanium trichloride composition used in Comparative Example 56 was extracted and washed in the same way as in Example 44, and the resulting titanium trichloride composition was used; Comparative Example 59 in which the procedure of Example 44 was repeated except that a titanium trichloride composition was first extracted and washed with a solvent and then pulverized in the absence of the auxiliary component; Comparative Example 60 in which the procedure of Example 44 was repeated except that a titanium trichloride composition obtained by extracting and washing the titanium trichloride composition used in Comparative Example 59 further with a solvent was used; Comparative Example 61 in which the procedure of Example 44 was repeated except that a titanium trichloride composition obtained by reducing titanium tetrachloride with metallic aluminum in the presence of an auxiliary component (organic oxygen-containing component) and without pulverizing, extracted and washed with a solvent in the same manner as set forth in Example 44 was used; Comparative Example 62 in which the procedure of Example 44 was repeated except that a titanium trichloride obtained by reducing titanium tetrachloride with metallic aluminum in the presence of an auxiliary component (organic oxygen-containing compound) and pulverizing the resulting titanium trichloride with the omission of the extracting and washing step was used; and Comparative Example 63 in which the procedure of Example 44 was repeated except that a titanium trichloride composition used was obtained by reducing titanium tetrachloride with hydrogen.

TABLE III-b

| | TiCl₃ components | | | Polypropylene | | |
|---|---|---|---|---|---|---|
| | Auxiliary component | | Extraction solvent | Total yield (g.) | T.I. (percent) | A.D. (g./cc.) |
| | Class | Amt., g. | | | | |
| Ex. 45 [1] | Toluene | 2.0 | Toluene | 101.2 | 97.1 | 0.412 |
| Comp. 64 [1] | do | 2.0 | | 89.0 | 94.5 | |
| Ex. 46 | Kerosene | 2.4 | n-Heptane | 62.5 | 94.8 | 0.391 |
| Ex. 47 | do | 2.4 | Toluene | 69.8 | 96.4 | 0.385 |
| Ex. 48 | do | 2.4 | Chlorobenzene | 74.5 | 96.1 | 0.379 |
| Comp. 65 | do | 2.4 | | 55.8 | 93.5 | 0.366 |
| Ex. 49 | n-Heptane | 2.2 | Toluene | 64.8 | 95.8 | 0.392 |
| Comp. 66 | do | 2.2 | | 48.8 | 93.3 | 0.366 |
| Ex. 50 | Decaline | 2.8 | Toluene | 70.7 | 95.4 | 0.429 |
| Comp. 67 | do | 2.8 | | 66.6 | 91.5 | 0.389 |
| Ex. 51 | Benzene | 2.4 | Toluene | 79.7 | 95.2 | 0.392 |
| Comp. 68 | do | 2.4 | | 69.4 | 91.7 | 0.354 |
| Ex. 52 | Naphthalene | 2.9 | Toluene | 91.3 | 95.2 | 0.388 |
| Comp. 69 | do | 2.9 | | 71.5 | 92.7 | 0.368 |
| Ex. 53 | Styrene | 2.3 | Toluene | 86.8 | 94.2 | 0.360 |
| Comp. 70 | do | 2.3 | | 71.6 | 89.3 | 0.330 |
| Ex. 54 [2] | Cyclohexane | 1.89 | Toluene | 349 | 95.8 | 0.398 |
| Comp. 71 [2] | do | 1.89 | | 225 | 92.5 | 0.353 |
| Ex. 55 | Chlorobenzene | 2.9 | Toluene | 84.0 | 95.7 | 0.403 |
| Comp. 72 | do | 2.9 | | 47.2 | 87.1 | 0.341 |
| Ex. 56 [3] | Trichloroethylene | 2.05 | Toluene | 28.0 | 92.8 | 0.345 |
| Ex. 57 [4] | Cyclohexane | 1.89 | do | 42 | 87 | 0.365 |
| Comp. 73 | do | 1.89 | | 35 | 84 | 0.345 |

[1] Experiment was performed as in Example 29.
[2] Polymerization was performed as in Example 31 except that 0.2 g. of TiCl₃ component and 590 g. of liquefied propylene were used at 50°C. for 4 hours.
[3] Polymerization of 4-methyl-1-pentene was performed as in Example 32.
[4] Copolymerization of ethylene and propylene was performed as in Example 33.

Example 58 and Comparative Examples 74 to 82

The procedure of Example 1 was repeated except that polymethyl siloxane having a molecular weight of 44,000 was used as the auxiliary component. The results obtained are given in Table IV-a.

This table also shows the results obtained in Comparative Example 74 in which propylene was polymerized in the same manner as in Example 58 except using the titanium trichloride composition not pulverized; Comparative Example 75 in which propylene was polymerized in the same way as set forth in Example 58 except that the pulverized titanium trichloride composition was used in the absence of the auxiliary component; Comparative Example 76 in which propylene was polymerized in the same way as set forth in Example 58 except that the extracting and washing treatment of the titanium trichloride composition was omitted; Comparative Example 77 in which the procedure of Example 58 was repeated except that the titanium trichloride composition used in Comparative Ex- TABLE III-a

| | TiCl₃ component | | | | | Polypropylene | | |
|---|---|---|---|---|---|---|---|---|
| | | Milling treatment step | | | Extraction treatment step | | | |
| | | | Auxiliary component | | | | Organoaluminum compound | Total yield (g.) | T.I. (percent) | A.D. (g./cc.) |
| | Reduction | Yes or no | Class | Amt., g | Yes or no | Solvent | | | | |
| Ex. 44 | Al | Yes | Cyclohexane | 1.89 | Yes | Toluene | (C₂H₅)₂AlCl | 88.0 | 96.0 | 0.378 |
| Comparison: | | | | | | | | | | |
| 55 | Al | No | | | No | | (C₂H₅)₂AlCl | 6.5 | 93.3 | |
| 56 | Al | Yes | | | No | | (C₂H₅)₂AlCl | 71.0 | 88.8 | 0.304 |
| 57 | Al | Yes | Cyclohexane | 1.89 | No | | (C₂H₅)₂AlCl | 63.0 | 91.5 | 0.357 |
| 58 | Al | No | | | Yes | Toluene | (C₂H₅)₂AlCl | 13.2 | 96.2 | |
| 59 | Al | Yes | | | Yes [2] | do | (C₂H₅)₂AlCl | 71.0 | 88.3 | 0.311 |
| 60 | Al | Yes | | | Yes [2] | do | (C₂H₅)₂AlCl | 81.5 | 91.0 | 0.302 |
| 61 | Al plus cyclohexane | | | | Yes | do | (C₂H₅)₂AlCl | 8.3 | 96.0 | |
| 62 | do | Yes | Cyclohexane | 1.89 | No | | (C₂H₅)₂AlCl | 64.0 | 93.4 | |
| 63 | Hydrogen | Yes | do | 1.89 | Yes | Toluene | (C₂H₅)₂AlCl | 34.8 | 88.9 | 0.330 |

[1] Extracted before milling.
[2] Extracted before and after milling.

Examples 45 to 57 and Comparative Examples 64 to 73

The procedure of Example 44 was repeated under varying conditions noted below. The results are shown in Table III-b.

ample 75 was extracted and washed in the same way as in Example 58, and the resulting titanium trichloride composition was used; Comparative Example 68 in which the procedure of Example 58 was repeated except that a titanium trichloride composition was first extracted and washed with a solvent and then pulverized in the absence of the auxiliary component; Comparative Example 79 in which the procedure of Example 58 was repeated except that a titanium trichloride composition obtained by extracting and washing the titanium trichloride composition used in Comparative Example 78 further with a solvent was used; Comparative Example 80 in which the procedure of Example 58 was repeated except that a titanium trichloride composition obtained by reducing titanium tetrachloride with metallic aluminum in the presence of an auxiliary component (organic oxygen-containing component) and without pulverizing, extracted and washed with a solvent in the same manner as set forth in Example 58 was used; Comparative Example 81 in which the procedure of Example 58 was repeated except that a titanium trichloride obtained by reducing titanium tetrachloride with metallic aluminum in the presence of an auxiliary component (organic oxygen-containing compound) and pulverizing the resulting titanium trichloride with the omission of the extracting and washing step was used; and Comparative Example 82 in which the procedure of Example 58 was repeated except that a titanium trichloride composition used was obtained by reducing titanium tetrachloride with hydrogen.

Example 69 and Comparative Examples 91 to 99

The procedure of Example 1 was repeated except that carbon disulfide was used as the auxiliary component.

This table also shows the results obtained in Comparative Example 91 in which propylene was polymerized in the same manner as in Example 69 except using the titanium trichloride composition not pulverized; Comparative Example 92 in which propylene was polymerized in the same way as set forth in Example 69 except that the pulverized titanium trichloride composition was used in the absence of the auxiliary component; Comparative Example 93 in which propylene was polymerized in the same way as set forth in Example 69 except that the extracting and washing treatment of the titanium trichloride composition was omitted; Comparative Example 94 in which the procedure of Example 69 was repeated except that the titanium trichloride composition used in Comparative Example 92 was extracted and washed in the same way as in Example 69, and the resulting titanium trichloride composition was used; Comparative Example 95 in which the procedure of Example 69 was repeated except that a titanium trichloride composition was first extracted and washed with a solvent and then pulverized in the absence of the auxiliary component; Comparative Example 96 in which the procedure of Example 69 was repeated except that a titanium trichloride composition obtained by extracting and washing the titanium trichloride composition used in Comparative Ex- TABLE IV-a

| | TiCl₃ component | | | | | | Polypropylene | | |
|---|---|---|---|---|---|---|---|---|---|
| | | Milling treatment step | | | Extraction treatment step | | | | |
| | Reduction | Yes or no | Auxiliary component | | Yes or no | Solvent | Organo-aluminum compound | Total yield (g.) | T.I. (percent) | A.D. (g./cc.) |
| | | | Class | Amt., g. | | | | | | |
| Example 58 | Al | Yes | Polymethyl siloxane (M.W. about 14,000). | 3.0 | Yes | Toluene | (C₂H₅)₂AlCl | 124 | 93.5 | |
| Comparison: | | | | | | | | | | |
| 74 | Al | No | | | No | | (C₂H₅)₂AlCl | 6.0 | | |
| 75 | Al | Yes | | | No | | (C₂H₅)₂AlCl | 71.0 | 88.9 | |
| 76 | Al | Yes | Polymethyl siloxane | 3.0 | No | | (C₂H₅)₂AlCl | 92.0 | 88.9 | |
| 77 | Al | No | | | Yes | Toluene | (C₂H₅)₂AlCl | 13.2 | 96.2 | |
| 78 | Al | Yes | | | Yes [1] | do [1] | (C₂H₅)₂AlCl | 71.0 | 88.3 | |
| 79 | Al | Yes | | | Yes [2] | do [2] | (C₂H₅)₂AlCl | 81.5 | 91.0 | |
| 80 | Al plus polymethyl siloxane. | No | | | Yes | do | (C₂H₅)₂AlCl | 8.3 | 96.0 | |
| 81 | do | Yes | Polymethyl siloxane | 3.0 | No | | (C₂H₅)₂AlCl | 72.1 | 86.3 | |
| 82 | Hydrogen | Yes | do | 3.0 | Yes | Toluene | (C₂H₅)₂AlCl | 68 | 82.0 | |

[1] Extracted before milling.
[2] Extracted before and after milling.

Examples 59 to 68 and Comparative Examples 83 to 90

The procedure of Example 58 was repeated under varying conditions as noted below. The results are shown in Table IV-b.

ample 95 further with a solvent was used; Comparative Example 97 in which the procedure of Example 69 was repeated except that a titanium trichloride composition obtained by reducing titanium tetrachloride with metallic TABLE IV-b

| | TiCl₃ component | | | | Polypropylene | |
|---|---|---|---|---|---|---|
| | Auxiliary component | | | Extraction Solvent | Total yield (g.) | T.I. (percent) |
| | Class | | Amount, | | | |
| Example 59 [1] | Methylhydropoly siloxane (kinematic viscosity 200 cs.) | | 3.0 | Toluene | 73.5 | 94.0 |
| Comparison 83 [1] | do | | 3.0 | | 57.0 | 90.4 |
| Example 60 | Hexamethyl disiloxane | | 3.0 | n-Heptane | 43.0 | 93.5 |
| Example 61 | do | | 3.0 | Toluene | 49.0 | 95.1 |
| Example 62 | do | | 3.0 | Chlorobenzene | 49.3 | 95.0 |
| Comparison 84 | do | | 3.0 | | 38.5 | 88.6 |
| Example 63 | 1,3-dichlorotetramethyl disiloxane | | 3.0 | Toluene | 47.1 | 93.6 |
| Comparison 85 | do | | 3.0 | | 38.0 | 89.9 |
| Example 64 | 3-hydroheptamethyl trisiloxane | | 3.0 | Toluene | 52 | 94.3 |
| Comparison 86 | do | | 3.0 | | 44 | 89.0 |
| Example 65 [2] | Polymethyl siloxane (M.W. 14,000) | | 3.0 | Toluene | 151 | 87.1 |
| Comparison 87 [2] | do | | 3.0 | | 120 | 83.5 |
| Example 66 [3] | do | | 3.0 | Toluene | 63.3 | 85.1 |
| Comparison 88 [3] | do | | 3.0 | | 51.6 | 82.1 |
| Example 67 [4] | do | | 3.0 | Toluene | 18 | 90.3 |
| Comparison 89 [4] | do | | 3.0 | | 13 | 86.8 |
| Example 68 [5] | do | | 3.0 | Toluene | 53 | 83.5 |
| Comparison 90 [5] | do | | 3.0 | | 38 | 81.2 |

[1] Experiment was performed as in Example 29.
[2] Polymerization was performed as in Example 31 except that 490 g. of liquefied propylene was used.
[3] Polymerization was performed as in Example 30.
[4] Polymerization of 4-methyl-1-pentene was performed as in Example 32.
[5] Copolymerization of ethylene and propylene was performed as in Example 33.

aluminum in the presence of an auxiliary component (organic oxygen-containing component) and without pulverizing, extracted and washed with a solvent in the same manner as set forth in Example 69 was used; Comparative Example 98 in which the procedure of Example 69 was repeated except that a titanium trichloride obtained by reducing titanium tetrachloride with metallic aluminum in the presence of an auxiliary component (organic oxygen-containing compound) and pulverizing the resulting titanium trichloride with the omission of the extracting and washing step was used; and Comparative Example 99 in which the procedure of Example 69 was repeated except that a titanium trichloride composition used was obtained by reducing titanium tetrachloride with hydrogen.

same way as set forth in Example 78 except that the extracting and washing treatment of the titanium trichloride composition was omitted; Comparative Example 109 in which the procedure of Example 78 was repeated except that the titanium trichloride composition used in Comparative Example 107 was extracted and washed in the same way as in Example 78, and the resulting titanium trichloride composition was used; Comparative Example 110 in which the procedure of Example 78 was repeated that a titanium trichloride composition was first extracted and washed with a solvent and then pulverized in the absence of the auxiliary component; Comparative Example 111 in which the procedure of Example 78 was repeated except that a titanium trichloride composition obtained by ex- TABLE V-a

| | TiCl₃ component | | | | | | Polypropylene | | |
|---|---|---|---|---|---|---|---|---|---|
| | | Milling treatment step | | | Extraction treatment step | | | | |
| | Reduction | Yes or no | Auxiliary component class | Amt., g. | Yes or no | Solvent | Organo-aluminum compound | Total yield (g.) | T.I. (percent) | A.D. (g./cc.) |
| Example 69 | Al | Yes | Carbon disulfide | 1.71 | Yes | Toluene | (C₂H₅)₂AlCl | 91.2 | 95.5 | 0.393 |
| Comparison: | | | | | | | | | | |
| 91 | Al | No | | | No | | (C₂H₅)₂AlCl | 6.0 | | |
| 92 | Al | Yes | | | No | | (C₂H₅)₂AlCl | 71.0 | 88.8 | 0.304 |
| 93 | Al | Yes | Carbon disulfide | 1.71 | No | | (C₂H₅)₂AlCl | 70.0 | 91.7 | 0.354 |
| 94 | Al | No | | | Yes | Toluene | (C₂H₅)₂AlCl | 13.2 | 96.2 | |
| 95 | Al | Yes | | | Yes¹ | do¹ | (C₂H₅)₂AlCl | 71.0 | 88.3 | |
| 96 | Al | Yes | | | Yes² | do² | (C₂H₅)₂AlCl | 81.5 | 91.0 | |
| 97 | Al plus carbon disulfide | No | | | Yes | do | (C₂H₅)₂AlCl | 12.1 | 93.3 | |
| 98 | do | Yes | Carbon disulfide | 1.71 | No | | (C₂H₅)₂AlCl | 80.4 | 91.1 | |
| 99 | Hydrogen | Yes | do | 1.71 | Yes | Toluene | (C₂H₅)₂AlCl | 36 | 88.4 | 0.290 |

¹ Extracted before milling.
² Extracted before and after milling.

Examples 70 to 77 and comparative Examples 100 to 105

The procedure of Example 69 was repeated under varying conditions noted below. The results are shown in Table V-b.

tracting and washing the titanium trichloride composition used in Comparative Example 110 further with a solvent was used; Comparative Example 112 in which the procedure of Example 78 was repeated except that a titanium

TABLE V-B

| | TiCl₃ component | | | Polypropylene | | |
|---|---|---|---|---|---|---|
| | Auxiliary component | | | | | |
| | Class | Amount, grams | Extraction solvent | Total yield (g.) | T.I. (percent) | A.D. (g./cc.) |
| Example 70 | Carbon disulfide | 1.71 | Toluene | 86.2 | 95.0 | 0.358 |
| Example 71 | do | 1.71 | n-Heptane | 84.0 | 94.3 | 0.379 |
| Example 72 | do | 1.71 | Chlorobenzene | 94.0 | 95.6 | 0.388 |
| Comparison 100 | do | 1.71 | | 69.2 | 91.8 | 0.356 |
| Example 73¹ | do | 1.71 | do | 102 | 96.6 | 0.399 |
| Comparison 101¹ | do | 1.71 | | 78.5 | 92.6 | 0.357 |
| Example 74¹ | do | 1.71 | n-Heptane | 185 | 94.4 | 0.395 |
| Comparison 102² | do | 1.71 | | 138 | 90.5 | 0.350 |
| Example 75 | do | 1.71 | Chlorobenzene | 64.2 | 88.3 | 0.359 |
| Comparison 103³ | do | 1.71 | | 48.9 | 85.3 | 0.330 |
| Example 76⁴ | do | 1.71 | do | 28.0 | 92.1 | 0.340 |
| Comparison 104⁴ | do | 1.71 | | 22 | 89.0 | 0.300 |
| Example 77⁵ | do | 1.71 | Toluene | 46 | 85 | 0.365 |
| Comparison 105 | do | 1.71 | | 35 | 82 | 0.340 |

NOTE.—The footnotes in the above table signify the same meaning as those in Table IV-b.

Example 78 and Comparative Examples 106 to 114

The procedure of Example 1 was repeated except that phenyl isocyanate was used as the auxiliary component. The results obtained are given in Table VI-a.

This table also shows the results obtained in Comparative Example 106 in which propylene was polymerized in the same manner as in Example 78 except using the titanium trichloride composition not pulverized; Comparative Example 107 in which propylene was polymerized in the same way as set forth in Example 78 except that the pulverized titanium trichloride composition was used in the absence of the auxiliary component; Comparative Example 108 in which propylene was polymerized in the trichloride composition obtained by reducing titanium tetrachloride with metallic aluminum in the presence of an auxiliary component (organic oxygen-containing component) and without pulverizing, extracted and washed with a solvent in the same manner as set forth in Example 78 was used; Comparative Example 113 in which the procedure of Example 78 was repeated except that a titanium trichloride obtained by reducing titanium tetrachloride with metallic aluminum in the presence of an auxiliary component (organic oxygen-containing compound) and pulverizing the resulting titanium trichloride with the omission of the extracting and washing step was used; and Comparative Example 114 in which the procedure of Example 78 was repeated except that a titanium trichloride composition used was obtained by reducing titanium tetrachloride with hydrogen.

trichloride composition was used; Comparative Example 130 in which the procedure of Example 93 was repeated TABLE VI-a

| | TiCl₃ component | | | | | | Polypropylene | |
|---|---|---|---|---|---|---|---|---|
| | | Milling treatment step | | | Extraction treatment step | | | |
| | Reduction | Yes or no | Auxiliary component | Amount, g. | Yes or no | Solvent | Organo-aluminum compound | Total yield (g.) | A.D. (g./cc.) |
| Example 78 | Al | Yes | Phenyl isocyanate | 0.89 | Yes | Toluene | (C₂H₅)₂AlCl | 84.7 | 95.4 |
| Comparison: | | | | | | | | | |
| 106 | Al | No | | | No | | (C₂H₅)₂AlCl | 6.0 | |
| 107 | Al | Yes | | | No | | (C₂H₅)₂AlCl | 71.0 | 88.8 |
| 108 | Al | Yes | Phenyl isocyanate | 0.89 | No | | (C₂H₅)₂AlCl | 44.8 | 91.1 |
| 109 | Al | No | | | Yes | Toluene | (C₂H₅)₂AlCl | 13.2 | 96.2 |
| 110 | Al | Yes | | | Yes [1] | do.[1] | (C₂H₅)₂AlCl | 44.0 | 90.8 |
| 111 | Al | Yes | | | Yes [2] | do.[2] | (C₂H₅)₂AlCl | 81.5 | 91.0 |
| 112 | Al plus phenyl isocyanate. | No | | | Yes | do | (C₂H₅)₂AlCl | 6.0 | 94.0 |
| 113 | do | Yes | Phenyl isocyanate | 0.89 | No | | (C₂H₅)₂AlCl | 21.3 | 90.1 |
| 114 | Hydrogen | Yes | do | 0.89 | Yes | Toluene | (C₂H₅)₂AlCl | 10.2 | 84.0 |

[1] Extracted before milling.
[2] Extracted before and after milling.

Examples 79 to 92 and Comparative Examples 115 to 125

The procedure of Example 78 was repeated under varying conditions noted below. The results are shown in Table VI-b.

except that a titanium trichloride composition was first extracted and washed with a solvent and then pulverized in the absence of the auxiliary component; Comparative Example 131 in which the procedure of Example 93 was re- TABLE VI-b

| | TiCl₃ component | | | Polypropylene | | |
|---|---|---|---|---|---|---|
| | Auxiliary component | | | Total yield (g.) | T.I. (percent) | A.D. (g./cc.) |
| | Class | Amount, g. | Extraction solvent | | | |
| Example: | | | | | | |
| 79 | Benzonitrile | 0.77 | Toluene | 96.4 | 94.3 | 0.377 |
| 80 | do | 0.77 | Chlorobenzene | 100.4 | 94.8 | |
| Comparison 115 | do | 0.77 | | 41.2 | 88.5 | |
| Example 81 [1] | Azobenzene | 1.37 | Toluene | 140.1 | 95.2 | |
| Comparison 116 [1] | do | 1.37 | | 48.0 | 88.9 | |
| Example 82 [2] | Phenyl isocyanate | 0.89 | Toluene | 340 | 95.2 | |
| Comparison 117 [2] | do | 0.89 | | 182 | 90.4 | |
| Example 83 [3] | do | 0.89 | Toluene | 56.5 | 88.7 | |
| Comparison 118 [3] | do | 0.89 | | 26.2 | 84.6 | |
| Example 84 [4] | do | 0.89 | Toluene | 29.0 | 92.3 | |
| Comparison 119 [4] | do | 0.89 | | 14.3 | 88.7 | |
| Example 85 [5] | do | 0.89 | Toluene | 49 | 86.1 | |
| Comparison 120 [5] | do | 0.89 | | 24 | 82.3 | |
| Example 86 | Tri-n-butyl amine | 1.2 | Chlorobenzene | 135.1 | 95.5 | |
| Comparison: | | | | | | |
| 121 | do | 1.2 | | 60 | 88.7 | |
| 122 | Dimethyl acetamide | 1.3 | Chlorobenzene | 67.2 | 86.3 | |
| Example 87 | Pyridine | 0.6 | Toluene | 140.3 | 95.1 | |
| Example 88 | do | 0.6 | Chlorobenzene | 124.2 | 94.5 | |
| Example 89 | do | 0.6 | Carbon disulfied | 117.0 | 94.8 | |
| Example 90 | do | 0.6 | Trichloroethylene | 113.3 | 95.8 | |
| Comparison 123 | do | 0.6 | | 64.3 | 88.5 | |
| Example 91 | n-Butyl amine | 0.6 | Chlorobenzene | 108.8 | 94.6 | |
| Comparison 124 | do | 0.6 | | 62.1 | 87.8 | |
| Example 92 | Phenyl isocyanate | 1.0 | Toluene | 113.1 | 96.2 | |
| Comparison 125 | do | 1.0 | | 44.2 | 96.7 | |

NOTE.—The references in the above table signify the same meanings as those in Table IV-b.

Example 93 and Comparative Examples 126 to 134

The procedure of Example 1 was repeated except that triphenyl phosphite was used as the auxiliary component. The results obtained are given in Table VII-a.

This table also shows the results obtained in Comparative Example 126 in which propylene was polymerized in the same manner as in Example 93 except using the titanium trichloride composition not pulverized; Comparative Example 127 in which propylene was polymerized in the same way as set forth in Example 93 except that the pulverized titanium trichloride composition was used in the absence of the auxiliary component; Comparative Example 128 in which propylene was polymerized in the same way as set forth in Example 93 except that the extracting and washing treatment of the titanium trichloride composition was omitted; Comparative Example 129 in which the procedure of Example 93 was repeated except that the titanium trichloride composition used in Comparative Example 127 was extracted and washed in the same way as in Example 93, and the resulting titanium peated except that a titanium trichloride composition obtained by extracting and washing the titanium trichloride composition used in Composition used in Comparative Example 130 further with a solvent was used; Comparative Example 132 in which the procedure of Example 93 was repeated except that a titanium trichloride composition obtained by reducing titanium tetrachloride with metallic aluminum in the presence of an auxiliary component (organic oxygen-containing component) and without pulverizing, extracted and washed with a solvent in the same manner as set forth in Example 93 was used; Comparative Example 133 in which the procedure of Example 93 was repeated except that a titanium trichloride obtained by reducing titanium tetrachloride with metallic aluminum in the presence of an auxiliary component (organic oxygen-containing compound) and pulverizing the resulting titanium trichloride with the omission of the extracting and washing step was used; and Comparative Example 134 in which the procedure of Example 93 was repeated except that a titanium trichloride composition used was obtained by reducing titanium tetrachloride with hydrogen.

TABLE VII-a

| | TiCl₃ component | | | | | | Polypropylene | |
|---|---|---|---|---|---|---|---|---|
| | | Milling treatment step | | | Extraction treatment step | | | |
| | Reduction | Yes or no | Auxiliary component, class | Amount, (g.) | Yes or no | Solvent | Organo-aluminum compound | Total yield (g.) | T.I. (percent) |
| Example 93 | Al | Yes | Triphenyl phosphite | 4.6 | Yes | Toluene | (C₂H₅)₂AlCl | 88.8 | 94.8 |
| Comparison: | | | | | | | | | |
| 126 | Al | No | | | No | | (C₂H₅)₂AlCl | 6.0 | |
| 127 | Al | Yes | | | No | | (C₂H₅)₂AlCl | 71.0 | 88.8 |
| 128 | Al | Yes | Triphenyl phosphite | 4.6 | No | | (C₂H₅)₂AlCl | 45.2 | 91.6 |
| 129 | Al | No | | | Yes | Toluene | (C₂H₅)₂AlCl | 13.2 | 96.2 |
| 130 | Al | Yes | | | Yes¹ | do¹ | (C₂H₅)₂AlCl | 71.0 | 88.3 |
| 131 | Al | Yes | | | Yes² | do² | (C₂H₅)₂AlCl | 81.5 | 91.4 |
| 132 | Al plus triphenyl phosphite | No | | | Yes | do | (C₂H₅)₂AlCl | 12.5 | 95.3 |
| 133 | do | Yes | Triphenyl phosphite | 4.6 | No | | (C₂H₅)₂AlCl | 52.3 | 89.0 |
| 134 | Hydrogen | Yes | do | 4.6 | Yes | Toluene | (C₂H₅)₂AlCl | 30.8 | 85.2 |

¹ Extracted before milling.
² Extracted before and after milling.

Examples 94 to 95 and Comparative Examples 135 to 144

The procedure of Example 93 was repeated under varying conditions noted below. The results are shown in Table VII-b.

TABLE VII-b

| | TiCl₃ component | | | Polypropylene | |
|---|---|---|---|---|---|
| | Auxiliary component | | | | |
| | Class | Amt., g. | Extraction solvent | Total yield (g.) | T.I. (percent) |
| Ex. 94 | Triphenyl phosphite | 4.6 | Toluene | 90.2 | 95.0 |
| Comp. 135 | Triphenyl phosphate | 4.6 | do | 68.1 | 80.1 |
| Ex. 95 | Triphenyl phosphite | 4.6 | Chlorobenzene | 92.4 | 95.3 |
| Ex. 96 | Trimethyl phosphite | 1.5 | do | 84.8 | 95.2 |
| Comp. 136 | do | 1.5 | | 51.2 | 90.4 |
| Ex. 97 | Triethyl phosphite | 2.4 | Chlorobenzene | 84.2 | 94.9 |
| Comp. 137 | do | 2.4 | | 46.2 | 90.8 |
| Ex. 98 | Tributyl phosphite | 3.0 | Toluene | 83.1 | 95.1 |
| Comp. 138 | do | 3.0 | | 41.5 | 91.0 |
| Ex. 99 | Trixylyl phosphite | 5.2 | Toluene | 88.0 | 95.3 |
| Comp. 139 | do | 5.2 | | 45.2 | 90.3 |
| Ex. 100¹ | Triphenyl phosphite | 4.6 | Toluene | 101.1 | 95.7 |
| Comp. 140¹ | do | 4.6 | | 52.4 | 92.2 |
| Ex. 101¹ | do | 4.6 | Toluene | 352 | 94.3 |
| Comp. 141² | do | 4.6 | | 176 | 90.5 |
| Ex. 102³ | do | 4.6 | Toluene | 50.4 | 88.0 |
| Comp. 142³ | do | 4.6 | | 26.2 | 85.2 |
| Ex. 103⁴ | do | 4.6 | Toluene | 28 | 92.0 |
| Comp. 143⁴ | do | 4.6 | | 16 | 89.3 |
| Ex. 104⁵ | do | 4.6 | Toluene | 48 | 85.5 |
| Comp. 144⁵ | do | 4.6 | | 25 | 82.6 |
| Ex. 105 | Triphenyl phosphite | 2.4 | Trichloroethylene | 82.5 | 96.3 |

NOTE.—The references in the above table signify the same meanings as those in Table IV-b.

Example 106 and Comparative Examples 145 to 153

Thirty grams of a light reddish purple titanium trichloride composition obtained in Example 1 and each of the auxiliary components indicated in Table VIII-a were treated in a ball mill in the same manner as in Example 1. Fifteen grams of the pulverized product obtained were extracted and washed with trichloroethylene or carbon disulfide as shown in Table VIII for 24 hours under reflux using a Soxhlet extractor equipped with a glass filter in an atmosphere of nitrogen in the same manner as set forth in Example 1. Olefins were polymerized using the titanium trichloride composition obtained, and solid polyolefins were prepared. The results are shown in Table VIII-a.

This table and Table VIII-b also show the results obtained in Comparative Example 145 in which the polymerization of olefin was performed in the same way as set forth in Example 106 except that the extracting and washing of the titanium trichloride composition was not performed; Comparative Examples 146 and 147 which show that after pulverizing, the titanium trichloride composition should be extracted and washed; Comparative Examples 154 to 159 and 163 to 168 which show that trichloroethylene alone is usable as the extracting and washing agent among halogenated hydrocarbons; Comparative Example 148 which shows that commercially available titanium trichloride composition (TiCl₃AA, Stauffer Chemical Company) proves unsuitable; Comparative Examples 149 and 160 in which propylene was polymerized in the same manner as set forth in Example 106 except that titanium trichloride obtained by reduction of titanium tetrachloride with hydrogen was used; and Comparative Examples 160 and 161 which show that the desired effects cannot be obtained if a large quantity of the extracting agent is present during pulverization.

TABLE VIII-a

| | TiCl₃ component | | | | | | | Polypropylene | |
|---|---|---|---|---|---|---|---|---|---|
| | | Milling treatment step | | | Extraction treatment step | | | | |
| | | | Auxiliary component | | | | | | |
| | Reduction | Yes or no | Class | Amt., g. | Yes or no | Solvent | Organo-aluminum compound | Total yield (g.) | T.I. (percent) |
| Ex. 106 | Al | Yes | Butyl acetate | 1.8 | Yes | Trichloro ethylene | (C₂H₅)₂AlCl | 115.5 | 95.2 |
| Comparison: | | | | | | | | | |
| 145 | Al | No | | | No | | (C₂H₅)₂AlCl | 6.0 | |
| 146 | Al | Yes | | | No | | (C₂H₅)₂AlCl | 71.0 | 88.8 |
| 147 | Al | Yes | Butyl acetate | 1.8 | No | | (C₂H₅)₂AlCl | 59.2 | 90.6 |
| 148 | Al | No | | | Yes | Trichloro ethylene | (C₂H₅)₂AlCl | 11.3 | 95.6 |
| 149 | Al | Yes | | | Yes¹ | do | (C₂H₅)₂AlCl | 69.3 | 89.9 |
| 150 | Al | Yes | | | Yes² | do | (C₂H₅)₂AlCl | 74.5 | 91.2 |
| 151 | Al plus butyl acetate | No | | | Yes | do | (C₂H₅)₂AlCl | 5.0 | 94.0 |
| 152 | do | Yes | Butyl acetate | 1.8 | No | | (C₂H₅)₂AlCl | 32.1 | 89.2 |
| 153 | Hydrogen | Yes | do | 1.8 | Yes | Trichloro ethylene | (C₂H₅)₂AlCl | 40 | 89.3 |

¹ Extracted before milling.
² Extracted before and after milling.

Examples 107 to 137 and Comparative Examples 154 to 168

The procedure of Example 105 was repeated under varying conditions noted below. The results are shown in Table VIII-b.

Example 151; 25° C. in Example 153; 60° C. in Examples 159 and 162; and 70° C. in Examples 157, 160 and 164 to 172.

Polymerization of propylene was performed using the modified titanium trichloride composition in the same

TABLE VIII-b

| | TiCl₃ component | | | Polypropylene | |
|---|---|---|---|---|---|
| | Auxiliary component | | | Total yield (g.) | T.I. (percent) |
| | Class | Amount | Extraction solvent | | |
| Example: | | | | | |
| 107 | Butyl acetate | 1.8 g. | Trichloroethylene | 105 | 94.3 |
| 108 | anisole | 2.3 ml. | do | 120 | 95.3 |
| 109 | do | 2.3 ml. | Carbon disulfide | 115 | 94.8 |
| Comparison: | | | | | |
| 154 | do | 2.3 ml. | n-Butyl bromide | 55 | 83.8 |
| 155 | do | 2.3 ml. | Ethyl bromide | 77 | 83.3 |
| 156 | do | 2.3 ml. | Tetrachloroethane | 0 | |
| 157 | do | 2.3 ml. | Tetrafluoroethane | 60 | 90.3 |
| 158 | do | 2.3 ml. | Chloroform | 3 | |
| 159 | do | 2.3 ml. | Carbon tetrachloride | 0 | |
| Example: | | | | | |
| 110 | n-Heptane | 2.2 g. | Trichloroethylene | 80 | 96.2 |
| 111 | Chlorobenzene | 2.9 g. | do | 82 | 96.8 |
| 112 | Trichloro ethylene | 2.1 g. | Carbon disulfide | 85 | 96.6 |
| 113 | Ethanol | 0.4 g. | Trichloroethylene | 106 | 94.3 |
| 114 | Acetophenone | 1.8 g. | Carbon disulfide | 93 | 94.5 |
| 115 | Benzoyl chloride | 1.1 g. | Trichloroethylene | 89 | 95.4 |
| 116 | Carbon disulfide | 1.7 g. | do | 85 | 96.0 |
| 117 | do | 1.7 g. | Carbon disulfide | 91 | 96.3 |
| 118 [1] | o-Bromoanisole | 4.0 g. | Trichloroethylene | 125 | 95.4 |
| 119 [2] | do | 4.0 g. | do | 140 | 90.0 |
| 120 [3] | do | 4.0 g. | do | 62.8 | 86.4 |
| 121 [4] | b-Bromoanisole | 4.0 g. | do | 19 | 91.8 |
| 122 [5] | do | 4.0 g. | do | 55 | 84.9 |
| Comparison: | | | | | |
| 160 | Trichloroethylene | 100 cc. | | 25 | 80.9 |
| 161 | Carbon disulfide | 100 cc. | | 23 | 90.1 |
| Example 123 | Polymethyl siloxane (mol. wt. 14000). | 3.0 g. | Trichloroethylene | 126.5 | 95.5 |
| Comparison 162 | do | 3.0 g. | | 92.0 | 88.9 |
| Example: | | | | | |
| 124 | do | 3.0 g. | Trichloroethylene | 114 | 94.7 |
| 125 | Octamethyl tetrasiloxane | 3.0 g. | do | 132.5 | 95.6 |
| 126 | do | 3.0 g. | Carbon disulfide | 129.8 | 96.0 |
| Comparison: | | | | | |
| 163 | do | 3.0 g. | n-Butylbromide | 49 | 84.8 |
| 164 | do | 3.0 g. | Ethyl bromide | 71 | 80.3 |
| 165 | do | 3.0 g. | Dichloro ethane | 0 | |
| 166 | do | 3.0 g. | Tetrachloroethane | 58 | 90.8 |
| 167 | do | 3.0 g. | Chloroform | 4 | |
| 168 | do | 3.0 g. | Carbon tetrachloride | 0 | |
| Example: | | | | | |
| 127 | Hexamethyl disiloxane | 3.0 g. | Trichloroethylene | 121.2 | 95.3 |
| 128 | 1,3-dichlorotetramethyl siloxane. | 3.0 g. | Carbon disulfide | 109.4 | 95.3 |
| 129 | Trimethyl ethoxysilane | 3.0 g. | do | 103.4 | 94.7 |
| 130 | 3-hydroheptamethyl trisiloxane. | 3.0 g. | Trichloroethylene | 124.9 | 95.1 |
| 131 | Diphenyl dichlorosilane | 3.0 g. | Carbon disulfide | 99.3 | 95.6 |
| 132 | Hexaphenyl disilane | 3.0 g. | Trichloroethylene | 94.8 | 95.9 |
| 133 | Vinyl trichlorosilane | 2.3 g. | Carbon disulfide | 94.4 | 96.0 |
| 134 [1] | Methyl hydropolysiloxane (kinematic viscosity 200 cs.). | 3.0 g. | do | 138 | 95.7 |
| 135 [2] | do | 3.0 g. | do | 150 | 90.0 |
| 136 | do | 3.0 g. | do | 63.4 | 86.4 |
| 137 | do | 3.0 g. | do | 18 | 92.1 |
| 138 | do | 3.0 g. | do | 54 | 84.9 |

NOTE.—The references in the above table signify the same meanings as those in Table IV-b.

Examples 139 to 172 and Comparative Examples 169 to 181

An 800 ml. stainless steel cylindrical vessel was charged with 120 g. of an unpulverized titanium trichloride composition obtained in the same way as set forth in Example 1 or a mixture of the titanium trichloride composition and various auxiliary components, and the material was pulverized for 24 hours without any particular heating or cooling by means of a vibratory mill in the presence of 850 stainless steel balls each having a diameter of 10 mm. The pulverized composition obtained (30.0 g.) was extracted and washed with various mixed solvents with stirring. The titanium trichloride composition was recovered by filtration from the mixed solvent, and washed three times with pure toluene to remove the remaining mixed solvent, followed by drying in vacuo to form a modified titanium trichloride composition. The extracting and washing treatment was performed for 2 hours in Examples 140 to 152, 155, 156 and 164 to 172; for 24 hours in Example 153; and for 4 hours in Examples 157 to 163. The extracting and washing temperature was 70° C. in Examples 140 to 150; 50° C. in manner as set forth in Example 1. The results are shown in Table IX-a(1).

The following should be noted with respect to Table IX-b(1).

The silicon oil (1) in Example 146 has the following structural units:

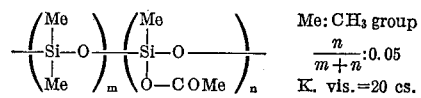

Me: CH₃ group
$\frac{n}{m+n}$: 0.05
K. vis.=20 cs.

The silicon oil (2) in Example 147 has the following structural units:

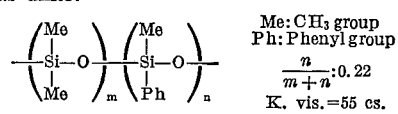

Me: CH₃ group
Ph: Phenyl group
$\frac{n}{m+n}$: 0.22
K. vis.=55 cs.

The structural units of the silicon oil (3) used in Example 148 are as follows:

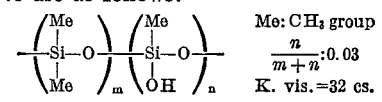

Me: CH₃ group
$\frac{n}{m+n}$: 0.03
K. vis.=32 cs.

Examples 173 to 196 and Comparative Examples 170 to 193

Unpulverized titanium trichloride composition (120 g.) obtained in the same way as set forth in Example 1 or a mixture of it with various auxiliary components was pulverized for 24 hours using the same apparatus without particularly heating or cooling, in the same way as shown in Example 139. In the same manner as set forth in Example 139, 30.0 g. of the pulverized product obtained were extracted and washed with various solvents, and further with toluene and dried to form a modified titanium trichloride composition. The extracting and washing time was 4 hours for Examples 173, 186, 187, and 189–196, 48 hours for Examples 174 to 178, and 2 hours for Examples 179 to 185. The extracting and washing temperature was 50° C. for Example 173, room temperature for Examples 174 to 178, and 60° C. for Examples 179 to 185.

Polymerization of propylene was performed using the modified titanium trichloride composition in the same way as set forth in Example 1. The results are given in Table IX–a(2).

Tables IX–a(1) and (2) show the results of Comparative Examples 169 and 182 in which the polymerization of propylene was performed in the same manner as set forth in Examples 139 and 173 except that an unpulverized titanium trichloride composition was used; Comparative Examples 170 and 182 in which propylene was polymerized in the same manner as set forth in Examples 139 and 173 except that the titanium trichloride composition used had been pulverized in the absence of the auxiliary component; Comparative Examples 171 and 183 in which propylene was polymerized in the same manner as set forth in Examples 139 and 173 except that the titanium trichloride composition obtained in the same way as set forth in Examples 139 and 173 with the omission of the extracting and washing treatment; Comparative Examples 172 and 184 in which the procedures set forth in Examples 139 and 173 were repeated except that the titanium trichloride composition obtained by extracting and washing the titanium trichloride composition used in Comparative Examples 170 and 182 in the same way as set forth in Examples 139 and 173 was used; Comparative Examples 173 and 185 in which the procedures set forth in Examples 139 and 173 were repeated except using the titanium trichloride composition obtained by extracting and washing the unpulverized titanium trichloride composition with a mixed solvent and then pulverizing it in the absence of an auxiliary component; Comparative Example 174 in which the procedure of Example 139 was repeated except that the titanium trichloride composition used in Comparative Example 170 was extracted and washed with toluene alone; Comparative Example 186 in which the procedure of Example 173 was repeated except that the titanium trichloride composition used in Example 182 was extracted and washed first with α-picoline, and then with toluene; Comparative Examples 175 and 187 in which the procedures of Examples 139 and 173 were repeated except that titanium tetrachloride was reduced with metallic aluminum in the presence of auxiliary components (toluene plus polymethyl siloxane; toluene plus α-picoline), and then with the omission of the pulverizing treatment, extracted and washed with a solvent in the same way as in Examples 139 and 173; Comparative Examples 176 and 188 in which the procedures of Examples 139 and 173 were repeated except that in Comparative Examples 175 and 187, the pulverizing treatment was performed but the extracting and washing treatment was omitted; and Examples 177 and 190 in which the procedures of Examples 139 and 173 were repeated except that the titanium trichloride composition used was obtained by reduction of titanium tetrachloride with hydrogen.

TABLE IX-a(1)

| | TiCl₃ component | | | | | | Polypropylene | | |
| | Milling treatment step | | | Extraction treatment step | | | | | |
| | | Auxiliary component | | | | Organo-aluminum compound | Total yield (g.) | T.I. (per-cent) | A.D. (g./cc.) |
| Reduction | Yes or no | Class | Amt., ml. | Yes or no | Solvent | | | | |
|---|---|---|---|---|---|---|---|---|---|
| Example 139... Al | Yes | | | Yes | {Toluene / Polymethyl siloxane} | (C₂H₅)₂Al | 118.3 | 94.1 | 0.362 |
| Comparison: | | | | | | | | | |
| 169...... Al | No | | | No | | (C₂H₅)₂Al | 6.0 | 93.3 | 0.369 |
| 170...... Al | Yes | | | No | | (C₂H₅)₂Al | 63.2 | 93.2 | 0.377 |
| 171...... Al | Yes | {Toluene / Polymethyl siloxane} | 1.5 / 1.5 | No | | (C₂H₅)₂Al | 86.3 | 89.1 | |
| 172...... Al | No | | | Yes | {Toluene / Polymethyl siloxane} | (C₂H₅)₂Al | 6.7 | 92.9 | 0.353 |
| 173...... Al | Yes | | | Yes¹ | {Toluene¹ / Polymethyl siloxane¹} | (C₂H₅)₂Al | 68.9 | 88.0 | |
| 174...... Al | Yes | | | Yes | Toluene | (C₂H₅)₂Al | 71.5 | 93.5 | 0.366 |
| 175...... Al plus toluene polymethyl siloxane | No | | | Yes | {Toluene / Polymethyl siloxane} | (C₂H₅)₂Al | 73.5 | 87.0 | |
| 176...... do | Yes | {Toluene / Polymethyl siloxane} | 1.5 / 1.5 | No | | (C₂H₅)₂Al | 70.5 | 89.8 | |
| 177...... Hydrogen | Yes | {Toluene / Polymethyl siloxane} | 1.5 / 1.5 | Yes | {Toluene / Polymethyl siloxane} | (C₂H₅)₂Al | 67.4 | 89.2 | 0.341 |

¹ Extracted before milling.

Examples 140 to 172 and Comparative Examples 178 to 180

The procedure of Example 139 was repeated except that varied conditions were used. The results are shown in Table IX–b(1).

TABLE IX-b(1)

| | TiCl₃ component | | Extraction solvent | | Polypropylene | | |
| | Auxiliary component | | | | Total yield (g.) | T.I. (g.) | A.D. (g./cc.) |
| | Class | Amt. (g.) | Class | Amt. | | | |
|---|---|---|---|---|---|---|---|
| Example: | | | | | | | |
| 140 | | | {Chlorobenzene / Hexamethyl disiloxane} | 300 ml / 45.3 mM | 141.2 | 93.8 | 0.369 |
| 141 | | | {Chlorobenzene / Diphenyl dichlorosilane} | 300 ml / 45.3 mM | 101.3 | 95.1 | 0.344 |
| 142 | | | {Chlorobenzene / Vinylmethyl dichlorosilane} | 300 ml / 45.3 mM | 93.2 | 94.0 | 0.344 |
| 143 | | | {Chlorobenzene / Phenyl trichlorosilane} | 300 ml / 45.3 mM | 103.7 | 94.4 | 0.399 |

TABLE IX-b(1)—Continued

| | TiCl₃ component | | | | Polypropylene | | |
|---|---|---|---|---|---|---|---|
| | Auxiliary component | | Extraction solvent | | Total yield (g.) | T.I. (g.) | A.D. (g./cc.) |
| | Class | Amt. (g.) | Class | Amt. | | | |
| 144 | | | Chlorobenzene / Hexamethyl silazane | 300 ml / 45.3 mM | 109.5 | 93.9 | 0.371 |
| 145 | | | Chlorobenzene / Octamethyl cyclotetrasiloxane | 300 ml / 45.3 mM | 139.8 | 93.6 | 0.353 |
| Comparison: | | | | | | | |
| 178 | | | | | 6.5 | 93.3 | 0.369 |
| 179 | | | Toluene / Polymethyl siloxane (kinematic viscosity 20 cs.) | 500 ml / 20 ml | 6.7 | 92.9 | 0.353 |
| Example: | | | | | | | |
| 146 | | | Chlorobenzene / Silicon oil (1) | 300 ml / 9 ml | 125.0 | 94.3 | 0.377 |
| 147 | | | Chlorobenzene / Silicon oil (2) | 300 ml / 9 ml | 140.0 | 93.7 | 0.379 |
| 148 | | | Chorobenzene / Silicon oil (3) | 300 ml / 9 ml | 90.2 | 93.3 | 0.331 |
| 149 | | | Toluene / Triphenyl silane | 100 ml / 50 ml | 121.5 | 95.3 | 0.362 |
| 150 | | | Toluene / N-methyl hexamethyl silazane | 100 ml / 50 ml | 130.3 | 94.6 | 0.366 |
| 151 | | | Toluene / Triphenyl silicon isocyanate | 100 ml / 10 ml | 96.1 | 93.4 | 0.325 |
| 152 | | | Toluene / p-Methoxy phenyl trimethyl silane | 100 ml / 50 ml | 145.2 | 95.1 | 0.354 |
| 153 | | | Toluene / Trimethylsilyl acetate | 100 ml / 30 ml | 103.3 | 93.9 | 0.349 |
| 154 [1] | | | Toluene / Polymethyl siloxane (kinematic viscosity 20 cs.) | 500 ml / 20 ml | 103.3 | 93.9 | 0.349 |
| 155 [2] | | | Toluene / Polymethyl siloxane (kinematic viscosity 30 cs.) | 500 ml / 20 ml | 105.1 | 86.3 | |
| Comp. 180 | | | | | 53.5 | 81.2 | |
| Example: | | | | | | | |
| 156 [3] | | | Toluene / Polymethyl siloxane (kinematic viscosity 20 cs.) | 500 ml / 20 ml | 23 | 92.3 | |
| 157 | | | Benzene / Dimethyl polysiloxane | 300 ml / 6 ml | 125.3 | 95.2 | 0.377 |
| 158 | | | Kerosene / Dimethyl polysiloxane | 300 ml / 6 ml | 105.2 | 94.8 | 0.369 |
| 159 | | | Hexane / Dimethyl polysiloxane | 300 ml / 6 ml | 87.7 | 93.8 | 0.354 |
| 160 | | | Heptane / Dimethyl polysiloxane | 300 ml / 6 ml | 89.9 | 94.1 | 0.345 |
| 161 | | | p-Xylene / Dimethyl polysiloxane | 300 ml / 6 ml | 110.3 | 94.9 | 0.366 |
| 162 | | | Trichloroethylene / Dimethyl polysiloxane | 300 ml / 6 ml | 80.5 | 93.9 | 0.344 |
| 163 | | | Carbon disulfide / Dimethyl polysiloxane | 300 ml / 6 ml | 83.9 | 93.7 | 0.369 |
| 164 | Anisole | 3.2 | Toluene / Dimethyl polysiloxane | 200 ml / 4 ml | 182 | 94.8 | |
| 165 | Butyl acetate | 1.5 | Toluene / Dimethyl polysiloxane | 200 ml / 4 ml | 130 | 94.9 | |
| 166 | Benzonitrile | 0.6 | Toluene / Dimethyl polysiloxane | 200 ml / 4 ml | 121 | 94.5 | |
| 167 | Pyridine | 0.5 | Toluene / Dimethyl polysiloxane | 200 ml / 4 ml | 148.0 | 94.5 | |
| 168 | Trichloroethylene | 1.5 | Toluene / Dimethyl polysiloxane | 200 ml / 4 ml | 131.1 | 95.7 | |
| 169 | Triphenyl phosphite | 3.3 | Toluene / Dimethyl polysiloxane | 200 ml / 4 ml | 110.3 | 95.2 | |
| 170 | Carbon disulfide | 1.4 | Toluene / Dimethyl polysiloxane | 200 ml / 4 ml | 113.5 | 95.7 | |
| 171 | Octamethyl cyclotetrasiloxane | 2.0 | Toluene / Dimethyl polysiloxane | 200 ml / 4 ml | 171.4 | 94.9 | |
| 172 | Toluene | 2.0 | Toluene / Dimethyl polysiloxane | 200 ml / 4 ml | 121.2 | 9.1 | |

[1] Polymerization of propylene was perfromed in the same way as set forth in Example 31.
[2] Polymerization of propylene was performed in the same way as set forth in Example 30.
[3] Polymerization of 4-methyl-1-pentene was performed in the same way as in Example 32.

TABLE IX-a(2)

| | TiCl₃ component | | | | | | Polypropylene | | |
|---|---|---|---|---|---|---|---|---|---|---|
| | | Milling treatment step | | | Extraction treatment step | | Organo-aluminum compound | Total yield (g.) | T.I. (percent) | A.D. (g./cc.) |
| | Reduction | Yes or no | Auxiliary component | | Yes or no | Solvent | | | | |
| | | | Class | Amt. | | | | | | |
| Example 173 | Al | Yes | | | Yes | Toluene plus α-picoline | (C₂H₅)₂AlCl | 152.5 | 95.1 | 0.379 |
| Comparison: | | | | | | | | | | |
| 181 | Al | No | | | No | | (C₂H₅)₂AlCl | 6.5 | 93.3 | 0.369 |
| 182 | Al | Yes | | | No | | (C₂H₅)₂AlCl | 63.2 | 93.2 | 0.377 |
| 183 | Al | Yes | Toluene / α-Picoline | 1.5 ml / 0.5 ml | No | | (C₂H₅)₂AlCl | 22.3 | 9.2 | |
| 184 | Al | No | | | Yes | Toluene plus α-picoline | (C₂H₅)₂AlCl | 6.7 | 92.9 | 0.353 |
| 185 | Al | Yes | | | Yes [1] | do [1] | (C₂H₅)₂AlCl | 63.8 | 89.6 | |
| 186 | Al | Yes | | | Yes [2] | 1st α-picoline, 2nd toluene.[2] | (C₂H₅)₂AlCl | 6.0 | 89.7 | |
| 187 | Al plus toluene plus k-picoline. | No | | | Yes | Toluene plus α-picoline | (C₂H₅)₂AlCl | 52.0 | 88.8 | |
| 188 | do | Yes | Toluene / α-Picoline | 1.5 ml / 0.015 mol | No | | (C₂H₅)₂AlCl | 50.7 | 88.0 | |
| 189 | Hydrogen | Yes | Toluene / α-Picoline | 1.5 ml / 0.015 mol | Yes | Toluene plus α-picoline | (C₂H₅)₂AlCl | 64.6 | 90.1 | |

[1] Extracted before milling.
[2] Extracted with two solvents one by one.

Examples 174 to 196 and Comparative Examples 190 to 193

The procedure of Example 174 was repeated except that varied conditions were employed. The results are shown in Table IX-b(2).

TABLE IX-b(2)

| | TiCl₃ component | | | | Polypropylene | | |
|---|---|---|---|---|---|---|---|
| | Auxiliary component | | Extraction solvent | | Total yield (g.) | T.I. (percent) | A.D. (g./cc.) |
| | Class | Amount | Class | Amount | | | |
| Example: | | | | | | | |
| 174 | | | Toluene / Pyridine | 300 ml / 0.1 | 138.5 | 96.1 | 0.378 |
| 175 | | | Toluene / 2-chloropyridine | 300 ml / 0.1 | 151.2 | 95.6 | 0.362 |
| 176 | | | Toluene / Quinoline | 300 ml / 0.1 | 120.1 | 94.4 | 0.366 |
| 177 | | | Toluene / Tributyl amine | 300 ml / 0.1 | 112.3 | 96.0 | 0.371 |
| 178 | | | Toluene / Trihexyl amine | 300 ml / 0.1 | 120.6 | 94.5 | 0.362 |
| 179 | | | Toluene / Triphenyl amine | 300 ml / 0.1 | 133.1 | 94.7 | 0.372 |
| 180 | | | Toluene / Diphenyl methyl amine | 300 ml / 0.1 | 141.3 | 95.3 | 0.365 |
| 181 | | | Toluene / N,N-dimethyl aniline | 300 ml / 0.1 | 121.7 | 95.0 | 0.360 |
| 182 | | | Toluene / N-ethyl morpholine | 300 ml / 0.1 | 99.2 | 95.7 | 0.331 |
| 183 | | | Toluene / Tolyl isocyanate | 300 ml / 0.1 | 90.3 | 95.3 | 0.354 |
| 184 | | | Toluene / Azobenzene | 300 ml / 0.1 | 108.0 | 94.8 | 0.361 |
| 185 | | | Toluene / Piperidine | 300 ml / 0.1 | 89.3 | 94.4 | 0.351 |
| 186 [1] | | | Toluene / α-Picoline | 500 ml / 0.12 | 158 | 87.8 | 0.340 |
| Comparison: | | | | | | | |
| 190 | | | Toluene / α-Picoline | 500 ml / 0.12 | 6.7 | 92.9 | |
| 191 [2] | | | | | 10.3 | 93.2 | |
| 192 | | | | | 63.2 | 93.2 | 0.377 |
| 193 | | | Toluene / N,N-dimethyl acetamide | 300 ml / 0.1 | 42.8 | 92.8 | 0.341 |
| Example: | | | | | | | |
| 187 [3] | | | Toluene / α-Picoline | 500 ml / 0.12 | 135.8 | 86.3 | |
| 188 [4] | | | Toluene / α-Picoline | 500 ml / 0.12 | 29 | 93.1 | |
| 189 | Anisole | 3.2 g | Toluene / α-Picoline | 200 ml / 0.012 mol | 169.3 | 95.5 | |
| 190 | α-Picoline | 1.0 g | Toluene / α-Picoline | 200 ml / 0.012 mol | 172.7 | 94.9 | |
| 191 | Butyl acetate | 1.5 g | Toluene / α-Picoline | 200 ml / 0.012 mol | 145.3 | 95.0 | |
| 192 | Benzonitrile | 0.6 g | Toluene / α-Picoline | 200 ml / 0.012 mol | 125.3 | 95.1 | |
| 193 | Trichloroethylene | 1.5 g | Toluene / α-Picoline | 200 ml / 0.012 mol | 120.1 | 94.4 | |
| 194 | Triphenyl phosphite | 3.3 g | Toluene / α-Picoline | 200 ml / 0.012 mol | 109.9 | 95.0 | |
| 195 | Octamethylcyclotetrasiloxane | 2.0 g | Toluene / α-Picoline | 200 ml / 0.012 mol | 149.0 | 94.3 | |
| 196 | Toluene | 2.0 g | Toluene / α-Picoline | 200 ml / 0.012 mol | 135.2 | 96.0 | |

[1] The procedure of Example 31 was repeated except that the amount charged of propylene was changed to 590 g.
[2] The titanium trichloride composition synthesized by the following procedure was used: One mol of TiCl₄, 0.12 mol of α-picoline and 0.2 mol of aluminum powder were mixed in 200 cc. of toluene, and reacted for 2 hours with stirring at the boiling point of the mixture. The solid product obtained was recovered by filtration, washed three times with toluene, and then dried.
[3] The procedure of Example 30 was repeated.
[4] The procedure of Example 32 was repeated except that 2.00 g. of the modified titanium trichloride composition was used.

What we claim is:
1. A catalyst composition consisting essentially of:
(A) a titanium trichloride composition obtained by pulverizing a titanium trichloride component prepared by reduction of titanium tetrachloride with metallic aluminum, in the presence of an auxiliary component in an amount of from 0.005 to 0.40 mol per mol of said titanium trichloride for the following auxiliary components (1), (2), (3) and (4), and from 0.01 to 1.4 mols per mol of said titanium trichloride, calculated as the Si-O or Si-N bond for auxiliary component (5), said auxiliary component being selected from the group consisting of

(1) an organic oxygen-containing compound selected from the group consisting of saturated aliphatic monoethers having an alkyl group of 2-32 carbon atoms, aliphatic ethers having an unsaturated aliphatic hydrocarbon group of 3-20 carbon atoms, aromatic ethers of 7-16 carbon atoms having a saturated alkyl group or aryl group, mono- or di-ethers having a halogen-substituted aromatic group of 7-16 carbon atoms, saturated alkyl esters of saturated aliphatic monocarboxylic acids having an aliphatic monocarboxylic acid residual group of 1-21 carbon atoms and a saturated alkyl group with 1-16 carbon atoms, unsaturated alkyl esters of saturated aliphatic monocarboxylic acids having a saturated aliphatic monocarboxylic acid residual group of 1-8 carbon atoms and an unsaturated alkyl group of 2-12 carbon atoms, alkyl esters of unsaturated aliphatic monocarboxylic acids having an unsaturated aliphatic monocarboxylic acid residual group of 2-12 carbon atoms and a saturated or unsaturated alkyl group of 1-10 carbon atoms, saturated alkyl esters of aromatic monocarboxylic acids having an aromatic monocarboxylic acid residual group of 7-18 carbon atoms and a saturated alkyl group of 1-20 carbon atoms, saturated aliphatic monoalcohols having 1-18 carbon atoms, monohydric and dihydric phenols having 6-16 carbon atoms, saturated aliphatic ketones having 3-20 carbon atoms, saturated aliphatic diketones having 4-12 carbon atoms, aromatic ketones having 7-18 carbon atoms, aromatic monocarboxylic acids having 7–18 carbon atoms, saturated aliphatic monocarboxylic acids having 1–20 carbon atoms, saturated aliphatic carboxylic acid halides having 2–12 carbon atoms, and aromatic carboxylic acid halides having 7–15 carbon atoms;

(2) an organic nitrogen-containing compound selected from the group consisting of saturated aliphatic primary amines having 1–18 carbon atoms, saturated aliphatic secondary amines having 2–24 carbon atoms, saturated aliphatic tertiary amines having 3–18 carbon atoms, aromatic amines having 6–20 carbon atoms, heterocyclic amines having 5–18 carbon atoms, aromatic mononitriles having 7–15 carbon atoms, aromatic monisocyanates having 7–11 carbon atoms, and aromatic azo compounds having 12–20 carbon atoms which may have a hydrocarbon group or halogen as substituent;

(3) an organic phosphorus-containing compound selected from the group consisting of trialkyl phosphines having 3–21 carbon atoms, ethyldichlorophosphine, tris(trifluoromethyl) phosphine, isobutyldichlorophosphine, chloromethyldichlorophosphine, triphenyl phosphine, trialkyl phosphites having 3–24 carbon atoms, and triaryl phosphite of 18–24 carbon atoms;

(4) a sulfur-containing compound selected from the group consisting of carbon disulfide, aliphatic thioethers having 2–10 carbon atoms, and aromatic thioethers having 7–12 carbon atoms; and (5) an organic silicon-containing compound selected from the group consisting of tetrahydrocarbylsilanes wherein the hydrocarbyl group are selected from saturated alkyl groups and aryl groups of 4–50 carbon atoms, tetrahydrocarbylsilanes of 5–28 carbon atoms having an unsaturated alkyl group, alkyl hydrogenosilanes of 1–30 carbon atoms having at least one Si—H bond, arylhydrogenosilanes of up to 30 carbon atoms having an Si—H bond, alkyl halogenosilanes of 3–30 carbon atoms having at least one Si-halogen bond, phenyl halogenosilanes of 6–30 carbon atoms having at least one Si-halogen bond, trialkylsilyl amines of 3–18 carbon atoms, triphenylsilyl amine, trimethyl (N-methylamino) silane, trimethyl (N,N-dimethylamino) silane, alkoxysilanes of 4–20 carbon atoms having at least one Si—O—C bond, phenyloxy silanes of 6–40 carbon atoms having at least one Si—O—C bond; $C_1$–$C_{10}$ aliphatic or $C_7$–$C_{11}$ aromatic monocarboxylic acid esters of $C_3$–$C_{10}$ trialkyl, $C_8$–$C_{20}$ alkylaryl or $C_{18}$–$C_{30}$ triphenyl silanols; trialkyl silicon isocyanates having 3–10 carbon atoms, dialkyl phenyl silicon isocyanates having 8–15 carbon atoms, triphenyl silicon isocyanate, polysilmethylenes of the formula $$CH_3SiCH_2[(CH_3)_2SiCH_2]_xSi(CH_3)_3$$

wherein $x$ is an integer of 1 to 10; linear polyalkyl polysilanes having 6–80 carbon atoms, polyphenyl polysilanes having 12–80 carbon atoms; polyalkyl cyclopolysilanes having 12–120 carbon atoms, polyaryl cyclopolysilanes having 12–120 carbon atoms, organopolysiloxanes of the formula $R(R'R''SiO)_xSiR_3$, wherein R, R' and R" may be the same or different and each represents an alkyl group having 1–4 carbon atoms, an aryl group having 6–8 carbon atoms, or a hydrogen atom, and $x$ is an integer of 1 to 1,000; $\alpha$-, $\omega$-dihaloalkyl polysiloxanes of the formula $X(R_2SiO)_xSiR_2X$, wherein R is an alkyl group, X is a halogen, and $x$ is an integer of 1 to 1,000, alkyl cyclopolysiloxanes of the formula 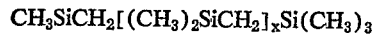 $(R'''HSiO)_y$, wherein R''' is an alkyl group of 1–4 carbon atoms, and $y$ is an integer of 3 to 8, alkyl cyclopolysiloxanes of the formula $$(R''''_2SiO)_z$$

wherein R'''' is an alkyl group of 1–4 carbon atoms, and $z$ is an integer of 3 to 9, aryl cyclopolysiloxanes of the formula $(Q_2SiO)_p$, wherein Q is an aryl group having 6–8 carbon atoms, and $p$ is an integer of 3 to 6; alkyl polysilazanes of 6–50 carbon atoms having an Si—N—Si bond and a molecular weight of not more than 1,000, and aryl polysilazanes of 6–50 carbon atoms having an Si—N—Si bond and a molecular weight of not more than 1,000;

until the α- or γ-type of said titanium trichloride cannot be identified in the X-ray diffraction pattern, and extracting the resulting titanium trichloride composition with a solvent in an amount of from 1 to 100 parts by weight per part of the pulverized titanium trichloride, with the proviso that when a mixed solvent is used, the amount of said auxiliary component selected from (1), (2) and (5) is 0.005 to 10.0 parts by weight per part of the titanium trichloride composition, said solvent being selected from the group consisting of (i) a compound selected from the group consisting of saturated aliphatic hydrocarbons having 3–20 carbon atoms, alicyclic hydrocarbons having 3–18 carbon atoms, and aromatic hydrocarbons having 6–20 carbon atoms;

(ii) a compound selected from the group consisting of halogenated benzenes and trichloroethylene;

(iii) carbon disulfide; and (iv) a mixed solvent of a compound selected from the group consisting of (i), (ii) and (iii) with a compound selected from the group consisting of auxiliary component (1), (2) and (5); and (B) an organoaluminum compound.

2. The catalyst composition of claim 1 wherein said organoaluminum compound is selected from the group consisting of trialkyl aluminum, dialkylaluminum halide, dialkylaluminum alkoxide, alkylaluminum alkoxy halide, alkylaluminum dihalide, reaction products of these with electron-donor compounds, reaction products of these with alkali metal halides, and reaction products of these with alkali metal complex fluorides of transition metals.

3. A process for polymerizing a monomer which comprises polymerizing or copolymerizing one or more monomers selected from the group consisting of ethylene, propylene, 1-butene, 3-methyl-1-butene, 1-pentene, 4-methyl-1-pentene, 1-hexene and styrene in the presence of a catalyst, said catalyst consisting essentially of:

(A) a titanium trichloride composition obtained by pulverizing a titanium trichloride component prepared by reduction of titanium tetrachloride with metallic aluminum, in the presence of an auxiliary component in an amount of from 0.005 to 0.40 mol per mol of said titanium trichloride for the following auxiliary components (1), (2), (3) and (4), and from 0.01 to 1.4 mols per mol of said titanium trichloride, calculated as the Si-O or Si-N bond for auxiliary component (5), said auxiliary component being selected from the group consisting of (1) an organic oxygen-containing compound selected from the group consisting of saturated aliphatic monoethers having an alkyl group of 2–32 carbon atoms, aliphatic ethers having an unsaturated aliphatic hydrocarbon group of 3–20 carbon atoms, aromatic ethers of 7–16 carbon atoms having a saturated alkyl group or aryl group, mono- or di-ethers having a halogen-substituted aromatic group of 7–16 carbon atoms, saturated alkyl esters of saturated aliphatic monocarboxylic acids having an aliphatic monocarboxylic acid residual group of 1–21 carbon atoms and a saturated alkyl group with 1–16 carbon atoms, unsaturated alkyl esters of saturated aliphatic monocarboxylic acids having a saturated aliphatic monocarboxylic acid residual group of 1–8 carbon atoms and an unsaturated alkyl group of 2–12 carbon atoms, alkyl esters of unsaturated aliphatic monocarboxylic acids having an unsaturated aliphatic monocarboxylic acid residual group of 2–12 carbon atoms and a saturated or unsaturated alkyl group of 1–10 carbon atoms, saturated alkyl esters of aromatic monocarboxylic acids having an aromatic monocarboxylic acid residual group of 7–18 carbon atoms and a saturated alkyl group of 1–20 carbon atoms, saturated aliphatic monoalcohols having 1–18 carbon atoms, monohydric and dihydric phenols having 6–16 carbon atoms, saturated aliphatic ketones having 3–20 carbon atoms, saturated aliphatic diketones having 4–12 carbon atoms, aromatic ketones having 7–18 carbon atoms, aromatic monocarboxylic acids having 7–18 carbon atoms, saturated aliphatic monocarboxylic acids having 1–20 carbon atoms, saturated aliphatic carboxylic acid halides having 2–12 carbon atoms, and aromatic carboxylic acid halides having 7–15 carbon atoms;
(2) an organic nitrogen-containing compound selected from the group consisting of saturated aliphatic primary amines having 1–18 carbon atoms, saturated aliphatic secondary amines having 2–24 carbon atoms, saturated aliphatic tertiary amines having 3–18 carbon atoms, aromatic amines having 6–20 carbon atoms, heterocyclic amines having 5–18 carbon atoms, aromatic mononitriles having 7–15 carbon atoms, aromatic monisocyanates having 7–11 carbon atoms, and aromatic azo compounds having 12–20 carbon atoms which may have a hydrocarbon group or halogen as substituent;
(3) an organic phosphorus-containing compound selected from the group consisting of trialkyl phosphines having 3–21 carbon atoms, ethyldichlorophosphine, tris(trifluoromethyl) phosphine, isobutyldichlorophosphine, chloromethyldichlorophosphine, triphenyl phosphine, trialkyl phosphites having 3–24 carbon atoms, and triaryl phosphite of 18–24 carbon atoms;
(4) a sulfur-containing compound selected from the group consisting of carbon disulfide, aliphatic thioethers having 2–10 carbon atoms, and aromatic thioethers having 7–12 carbon atoms; and
(5) an organic silicon-containing compound selected from the group consisting of tetrahydrocarbylsilanes wherein the hydrocarbyl group are selected from saturated alkyl groups and aryl groups of 4–50 carbon atoms, tetrahydrocarbylsilanes of 5–28 carbon atoms having an unsaturated alkyl group, alkyl hydrogenosilanes of 1–30 carbon atoms having at least one Si—H bond, arylhydrogenosilanes of up to 30 carbon atoms having an Si—H bond, alkyl halogenosilanes of 3–30 carbon atoms having at least one Si-halogen bond, phenyl halogenosilanes of 6–30 carbon atoms having at least one Si-halogen bond, trialkylsilyl amines of 3–18 carbon atoms, triphenylsilyl amine, trimethyl (N-methylamino) silane, trimethyl (N,N-dimethylamino) silane, alkoxysilanes of 4–20 carbon atoms having at least one Si—O—C bond, phenyloxy silanes of 6–40 carbon atoms having at least one Si—O—C bond; $C_1$–$C_{10}$ aliphatic or $C_7$–$C_{11}$ aromatic monocarboxylic acid esters of $C_3$–$C_{10}$ trialkyl, $C_8$–$C_{20}$ alkylaryl or $C_{18}$–$C_{30}$ triphenyl silanols; trialkyl silicon isocyanates having 3–10 carbon atoms, dialkyl phenyl silicon isocyanates having 8–15 carbon atoms, triphenyl silicon isocyanate, polysilmethylenes of the formula $$CH_3SiCH_2[(CH_3)_2SiCH_2]_xSi(CH_3)_3$$

wherein $x$ is an integer of 1 to 10; linear polyalkyl polysilanes having 6–80 carbon atoms, polyphenyl polysilanes having 12–80 carbon atoms; polyalkyl cyclopolysilanes having 12–120 carbon atoms, polyaryl cyclopolysilanes having 12–120 carbon atoms, organopolysiloxanes of the formula $R(R'R''SiO)_xSiR_3$, wherein R, R' and R'' may be the same or different and each represents an alkyl group having 1–4 carbon atoms, an aryl group having 6–8 carbon atoms, or a hydrogen atom, and $x$ is an integer of 1 to 1,000; $\alpha$-, $\omega$-dihaloalkyl polysiloxanes of the formula $X(R_2SiO)_xSiR_2X$, wherein R is an alkyl group, X is a halogen, and $x$ is an integer of 1 to 1,000; alkyl cyclopolysiloxanes of the formula $(R'''HSiO)_y$, wherein $R'''$ is an alkyl group of 1–4 carbon atoms, and $y$ is an integer of 3 to 8, alkyl cyclopolysiloxanes of the formula $(R''''_2SiO)_z$, wherein $R''''$ is an alkyl group of 1–4 carbon atoms, and $z$ is an integer of 3 to 9, aryl cyclopolysiloxanes of the formula $(Q_2SiO)_p$, wherein Q is an aryl group having 6–8 carbon atoms, and $p$ is an integer of 3 to 6; alkyl polysilazanes of 6–50 carbon atoms having an Si—N—Si bond and a molecular weight of not more than 1,000, and aryl polysilazanes of 6–50 carbon atoms having an Si—N—Si bond and a molecular weight of not more than 1,000;

until the $\alpha$- or $\gamma$-type of said titanium trichloride cannot be identified in the X-ray diffraction pattern, and extracting the resulting titanium trichloride composition with a solvent in an amount of from 1 to 100 parts by weight per part of the pulverized titanium trichloride, with the proviso that when a mixed solvent is used, the amount of said auxiliary component selected from (1), (2) and (5) is 0.005 to 10.0 parts by weight per part of the titanium trichloride composition, said solvent being selected from the group consisting of
(i) a compound selected from the group consisting of saturated aliphatic hydrocarbons having 3–20 carbon atoms, alicyclic hydrocarbons having 3–18 carbon atoms, and aromatic hydrocarbons having 6–20 carbon atoms;
(ii) a compound selected from the group consisting of halogenated benzenes and trichloroethylene;
(iii) carbon disulfide; and
(iv) a mixed solvent of a compound selected from the group consisting of (i), (ii) and (iii) with a compound selected from the group consisting of auxiliary component (1), (2) and (5); and
(B) an organoaluminum compound.
4. The process of claim 3 wherein said organoaluminium compound is selected from the group consisting of trialkyl aluminum, dialkylaluminum halide, dialkylaluminum alkoxide, alkylaluminum alkoxy halide, alkylaluminum dihalide, reaction products of these with electron-donor compounds, reaction products of these with alkali metal halides, and reaction products of these with alkali metal complex fluorides of transition metals.

References Cited

UNITED STATES PATENTS 3,010,787  11/1961  Tornquist ———————— 260—93.7

(Other references on following page)

UNITED STATES PATENTS

| | | | |
|---|---|---|---|
| 3,530,107 | 9/1970 | Yoshioka et al. | 260—93.7 |
| 3,560,146 | 2/1971 | Luciani et al. | 260—93.7 |
| 3,502,634 | 3/1970 | Stedefeder et al. | 260—93.7 |

FOREIGN PATENTS 1,560,602  2/1969  France.

JOSEPH L. SCHOFER, Primary Examiner

E. J. SMITH, Assistant Examiner

U.S. Cl. X.R.

252—429 B, 429 C; 260—80 PS, 93.5 S, 93.7, 94.9 B, 94.9 C, 94.9 E